United States Patent
Miyazaki et al.

(10) Patent No.: US 8,350,973 B2
(45) Date of Patent: Jan. 8, 2013

(54) AREA SENSOR AND DISPLAY DEVICE INCLUDING AREA SENSOR

(75) Inventors: Shinichi Miyazaki, Osaka (JP);
Norikazu Hohshi, Osaka (JP);
Masakazu Wada, Osaka (JP); Kengo Takahama, Osaka (JP); Toshiaki Nakagawa, Osaka (JP); Kohji Yabuta, Osaka (JP); Masayuki Hata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 212 days.

(21) Appl. No.: 12/994,155

(22) PCT Filed: Apr. 17, 2009

(86) PCT No.: PCT/JP2009/057793
§ 371 (c)(1),
(2), (4) Date: Nov. 23, 2010

(87) PCT Pub. No.: WO2009/150899
PCT Pub. Date: Dec. 17, 2009

(65) Prior Publication Data
US 2011/0128467 A1    Jun. 2, 2011

(30) Foreign Application Priority Data

Jun. 13, 2008  (JP) ................................. 2008-155990

(51) Int. Cl.
*G02F 1/1335* (2006.01)
*G06F 3/042* (2006.01)
(52) U.S. Cl. .......................................... 349/12; 345/175
(58) Field of Classification Search .................... 349/12; 345/175
See application file for complete search history.

(56) References Cited

U.S. PATENT DOCUMENTS

| 4,542,375 | A | 9/1985 | Alles et al. |
| 6,657,614 | B1 | 12/2003 | Ito et al. |
| 8,049,739 | B2 * | 11/2011 | Wu et al. ...................... 345/175 |
| 2003/0137494 | A1 | 7/2003 | Tulbert |

(Continued)

FOREIGN PATENT DOCUMENTS

JP    58-146928 A    9/1983

(Continued)

OTHER PUBLICATIONS

Official Communication issued in International Patent Application No. PCT/JP2009/057793, mailed on Jun. 2, 2009.

(Continued)

*Primary Examiner* — Michael Caley
(74) *Attorney, Agent, or Firm* — Keating & Bennett, LLP

(57) ABSTRACT

A liquid crystal display device (100) of the present invention includes: a liquid crystal panel (20) including: an active matrix substrate (21); a counter substrate (22); and a liquid crystal layer (23) provided between the active matrix substrate (21) and the counter substrate (22); and a backlight (10) illuminating the liquid crystal panel. The liquid crystal display device (100) has an area sensor function for detecting an external input position, and further includes a reflectance changing section (50) that reduces a reflectance of light from the backlight (10) in response to application of pressure on a panel surface (100a). The reflectance changing section (50) is configured so that in a state where no pressure is applied on the panel surface (100a), an air layer (50c) is formed between two elastic films (50a and 50b) whereas in a state where pressure is applied on the panel surface (100a), the two elastic films (50a and 50b) contact each other.

11 Claims, 15 Drawing Sheets

U.S. PATENT DOCUMENTS

| | | |
|---|---|---|
| 2006/0007224 A1 | 1/2006 | Hayashi et al. |
| 2007/0120833 A1 | 5/2007 | Yamaguchi et al. |
| 2007/0176907 A1 | 8/2007 | Ishii |
| 2008/0018612 A1 | 1/2008 | Nakamura et al. |
| 2008/0055266 A1 | 3/2008 | Harada et al. |
| 2008/0252618 A1 | 10/2008 | Chung et al. |
| 2010/0066704 A1 | 3/2010 | Kasai |

FOREIGN PATENT DOCUMENTS

| | | |
|---|---|---|
| JP | 2000-300543 A | 10/2000 |
| JP | 2001-067180 A | 3/2001 |
| JP | 2002-116428 A | 4/2002 |
| JP | 2003-122503 A | 4/2003 |
| JP | 2003-532216 A | 10/2003 |
| JP | 2006-018219 A | 1/2006 |
| JP | 2007-128497 A | 5/2007 |
| JP | 2007-226764 A | 9/2007 |
| JP | 2007-304245 A | 11/2007 |
| JP | 2008-027292 A | 2/2008 |
| JP | 2008-059253 A | 3/2008 |
| JP | 2008-083677 A | 4/2008 |
| JP | 2008-241807 A | 10/2008 |
| WO | 2008/066004 A1 | 6/2008 |
| WO | 2010/052956 A1 | 5/2010 |

OTHER PUBLICATIONS

Miyazaki et al; "Area Sensor and Display Device Including Area Sensor"; U.S. Appl. No. 12/921,878, filed Dec. 13, 2010.

Official Communication issued in corresponding International Application No. PCT/JP2009/063437, mailed on Nov. 2, 2009.

Miyazaki et al., "Area Sensor and Display Device Having Area Sensor", U.S. Appl. No. 13/126,574, filed Apr. 28, 2011.

\* cited by examiner

F I G. 9
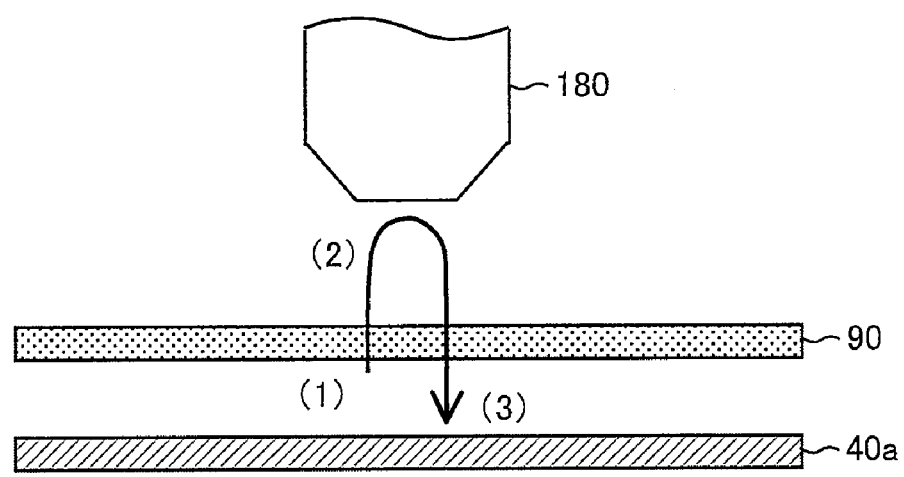

FIG. 10
POLARIZATION STATE
(1)
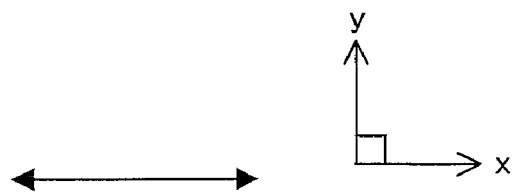
(2)
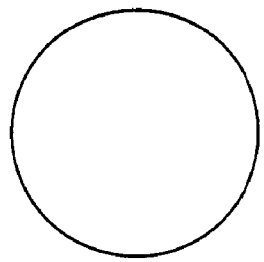
(3)
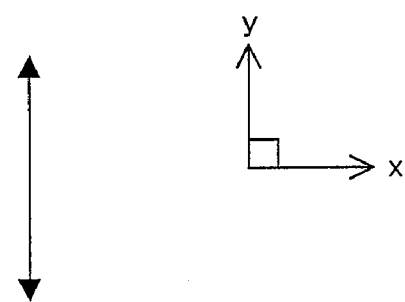

F I G. 1 1
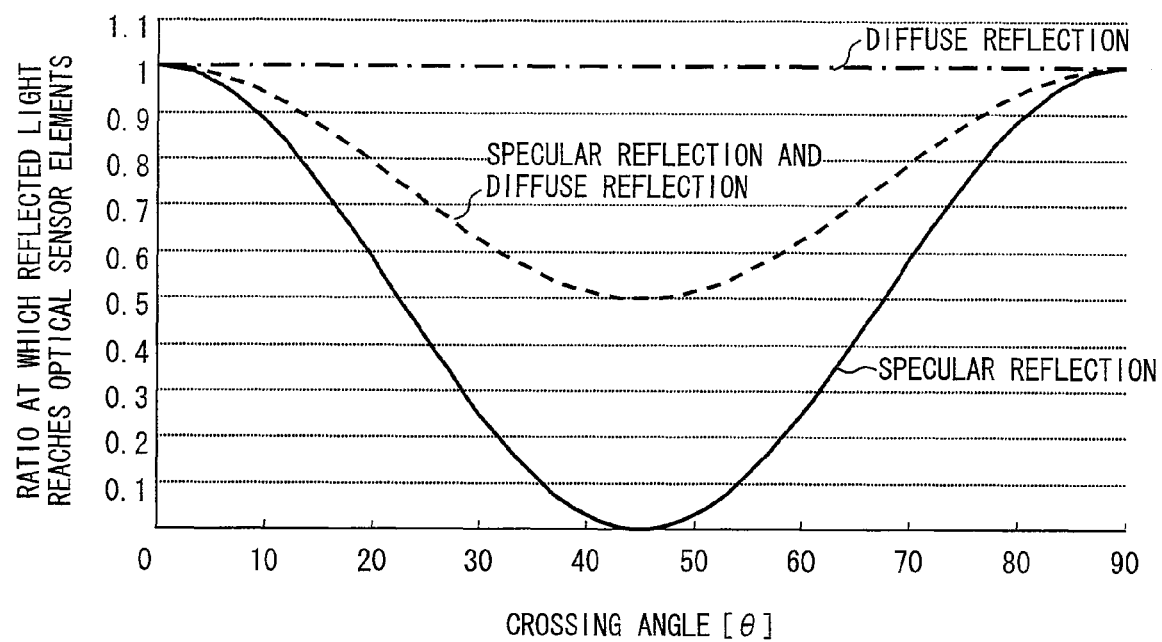

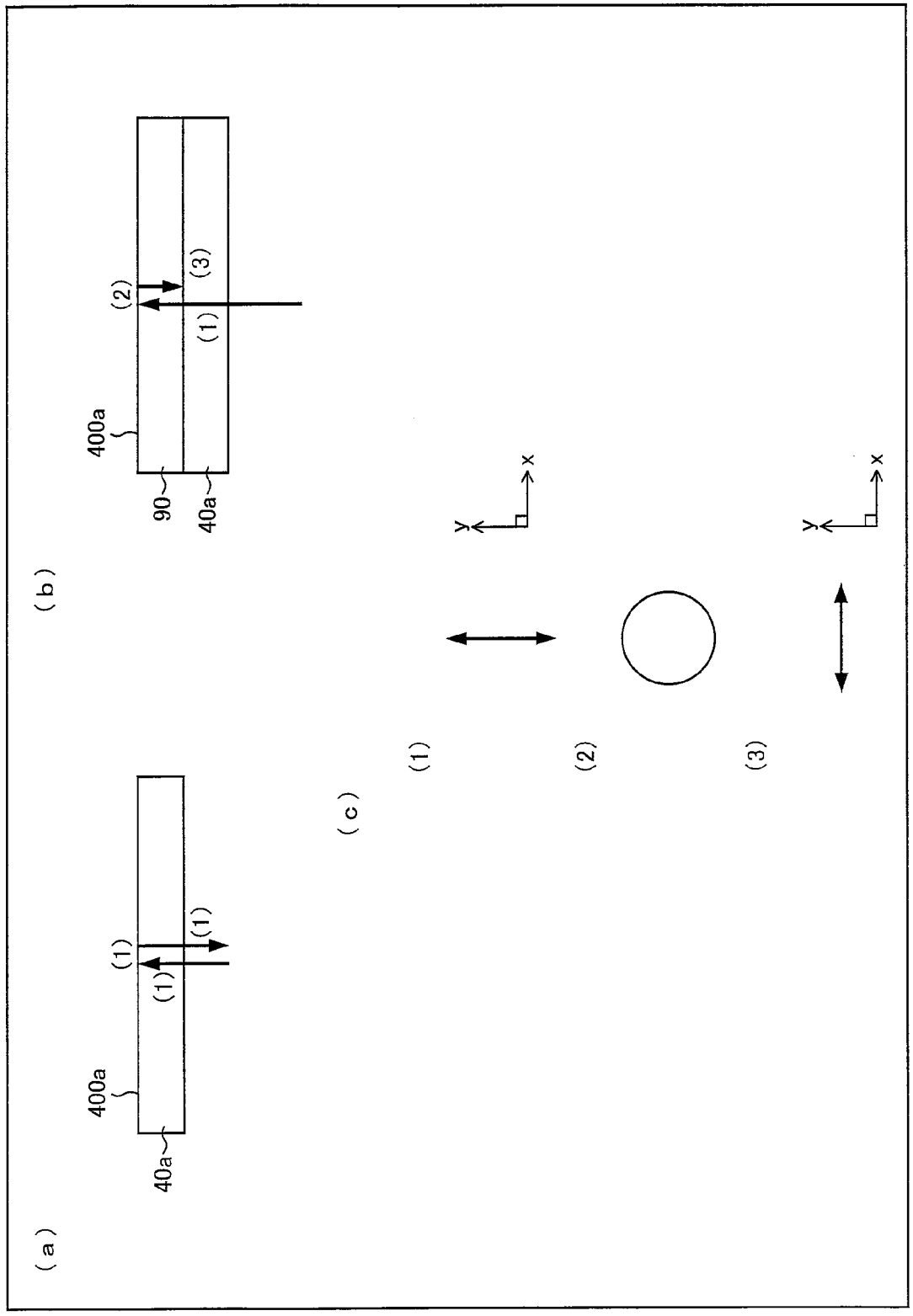

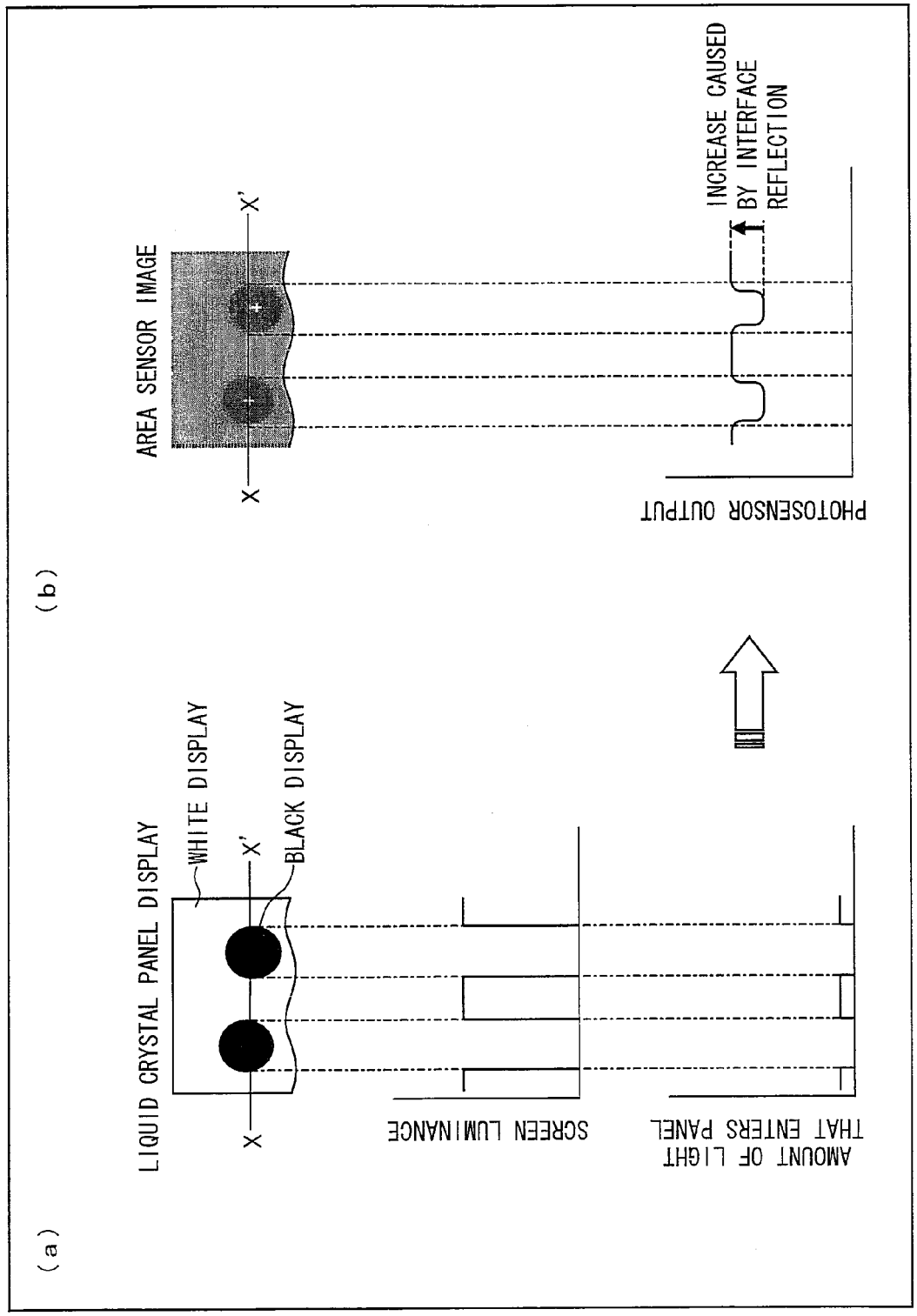

AREA SENSOR AND DISPLAY DEVICE INCLUDING AREA SENSOR

TECHNICAL FIELD

The present invention relates to: an area sensor including optical sensor elements which area sensor detects an external input position; and a display device that includes such an area sensor.

BACKGROUND ART

Display devices such as a liquid crystal display device include a display device integrated with a touch panel. Such a display device has been developed and has a touch panel (area sensor) function that can detect a touched position on a surface of the touch panel when the surface is touched by an input pen.

A resistive film type (a system in which an input position is detected by contact between an upper conductive substrate and a lower conductive substrate due to a press) and an electrostatic capacitive type (a system in which an input position is detected by detection of capacitance change in a touched position) are typical types of conventional display devices integrated with a touch panel.

Recently, there has been developed a liquid crystal display device in which an optical sensor element such as a photodiode or a phototransistor is provided in each pixel (or each group of a plurality of pixels) in an image display region (for example, see Patent Literature 1). It is thus possible to achieve a function as an area sensor (specifically, a scanner function, a touch panel function and the like) in a regular liquid crystal display device, by providing an optical sensor element in each pixel. That is, it is possible to achieve a display device integrated with a touch panel (or scanner), by causing the optical sensor element to serve as an area sensor.

CITATION LIST

Patent Literature

Patent Literature 1
Japanese Patent Application Publication, Tokukai, No. 2006-18219 A (Publication Date: Jan. 19, 2006)
Patent Literature 2
Japanese Patent Application Publication, Tokukai, No. 2001-67180 A (Publication Date: Mar. 16, 2001)

SUMMARY OF INVENTION

In a case where a liquid crystal display device including the optical sensor elements as described above is used as a display device having a touch panel function, the optical sensor elements recognize, as an image, a pen or a finger that is reflected on a display panel and detect a position of a tip of the pen or the finger.

In a case where a finger or a pen is used for carrying out a touch panel input to such a display device having a touch panel function, an amount of light that the optical sensor elements included in the liquid crystal display device receive does not change greatly between a case where the tip of the finger or the pen touches a panel surface and a case where the tip of the finger or the pen does not touch the panel surface. Therefore, it is difficult to precisely distinguish the case where the finger or the pen touches the panel surface from the case where the finger or the pen does not touch the panel surface.

Such a problem that it is difficult to distinguish whether the display panel is touched or not occurs not only in an area sensor included in a display device but also in an area sensor (for example, an optical pointing input device disclosed in Patent Literature 2) which utilizes an optical sensor element.

The present invention is attained in view of the above problem, and an object of the present invention is to provide an area sensor that can precisely distinguish a case where a finger or an input pen touches a panel surface from a case where a finger or an input pen does not touch the panel surface, and a display device including the area sensor.

In order to solve the problem described above, a liquid crystal display device of the present invention having an area sensor function for detecting an external input position by detecting an image on a panel surface, the liquid crystal display device comprising: a liquid crystal panel including: an active matrix substrate; a counter substrate; and a liquid crystal layer provided between the active matrix substrate and the counter substrate; a backlight illuminating the liquid crystal panel; a position detecting section (i) including a plurality of optical sensor elements each detecting an intensity of received light and (ii) detecting the external input position according to detection of the image on the panel surface by use of the plurality of optical sensor elements; and a reflectance changing section reducing a reflectance of light from the backlight in response to application of pressure on the panel surface, the reflectance changing section including at least two elastic films, the reflectance changing section being configured so that in a state where no pressure is applied on the panel surface, an air layer is formed between the two elastic films whereas in a case where pressure is applied on the panel surface, the two elastic films contact each other.

In the foregoing configuration, the backlight illuminates the position detecting section from a backside of the position detecting section. This means that the backlight illuminates the position detecting section from a side (of the position detecting section) opposite to the panel surface.

According to the foregoing configuration, when a finger, an input pen or the like touches the panel surface and applies pressure on the panel surface, the two elastic films of the reflectance changing section contact each other. Therefore, the air layer that is formed between the two elastic films disappears. This eliminates a reflection effect of light that occurs at a boundary surface between each elastic film and the air layer. As a result, a reflectance in a position where the two elastic films contact each other is reduced. Accordingly, an amount of reflected light among light from the backlight is reduced in an optical sensor element provided in a position where pressure is applied, as compared to an optical sensor element provided in a position where no pressure is applied. As a result, a darker image is detected in the position where pressure is applied than in the position where no pressure is applied.

Therefore, the foregoing configuration makes it possible to precisely distinguish a case where a finger, an input pen or the like touches the panel surface from a case where a finger, an input pen or the like does not touch the panel surface.

Further, as described above, the reflectance changing section is made of the two elastic films and the air layer that is formed between the two elastic films (the elastic films are flat in shape and each has a flat surface which faces the air layer). This reduces factors causing light scattering. As such, it is possible to suppress deterioration in display quality of an image displayed on the liquid crystal panel. Furthermore, according to the foregoing configuration, the reflectance changing section can be made of the two flat elastic films. This requires no high accuracy in forming the reflectance changing section. It is therefore possible to produce the reflectance changing section at low cost.

Note that as other means for controlling a reflectance of light, for example, there is a technique to control a density of convex lenses formed on the film. However, this technique has such a disadvantage that, when the density of the lenses is changed for increasing a range in which a reflectance changes between a case where the panel surface is touched and a case where the panel surface is not touched, a HAZE is varied. That is, when a density of the lenses is increased for increasing sensitivity of the optical sensor elements and a reflectance is accordingly increased, there occurs a problem that display quality is deteriorated because the HAZE is increased.

However, as described above, when the reflectance changing section is made of the two elastic films and the air layer that is formed between the two elastic films, it is possible to control a reflectance by controlling refractive indices of the elastic films. This makes it possible to increase the range in which the reflectance changes between the case where the panel surface is touched and the case where the panel surface is not touched, without increasing the HAZE.

Each of the elastic films may be a film made of silicon rubber or the like.

In the liquid crystal display device of the present invention, the reflectance changing section is provided with a distance retention section on at least one of the two elastic films, the distance retention section being for forming the air layer.

According to the foregoing configuration, it is possible to reliably form the air layer between the two elastic films in a state where no pressure is applied on the panel surface.

In the liquid crystal display device of the present invention, the liquid crystal panel is provided between two polarizing plates provided so as to face each other; and the reflectance changing section is provided between the liquid crystal panel and a polarizing plate provided closer to an image display surface than the other polarizing plate.

In a case where a backlight provided on a backside of the optical sensor elements is used as a light source and an image on the panel surface is detected by reflected light from an object on the panel surface, an amount of reflected light reduces when a display device displays a dark image such as a black display. This causes deterioration in detection sensitivity of an optical sensor.

According to the foregoing configuration, the reflectance changing section is provided on an inner side with respect to the polarizing plate provided closer to the image display surface than the other polarizing plate. Therefore, an amount of light that reaches the reflectance changing section from the backlight is uniform regardless of brightness of an image displayed on a liquid crystal panel. That is, regarding light from the backlight, the amount of light whose reflectance is changed by the reflectance changing section does not depend on a display on the liquid crystal panel. It is therefore possible to maintain sensitivity of the optical sensor elements without reducing an amount of light detected by the optical sensor elements, even when an image displayed on the liquid crystal panel is a dark image such as a black display.

The liquid crystal display device of the present invention further includes a quarter wave plate provided closer to the image display surface, as compared to the polarizing plate provided closer to the image display surface than the other polarizing plate.

According to the foregoing configuration, it is possible to reduce reflected light from an object (referred to as an input object) such as a finger or an input pen for making an input onto the panel surface. This can prevent detection sensitivity of optical sensor elements from being affected by the reflected light from the input object. Further, according to the foregoing configuration, it is possible to alleviate reflection of an image onto a substrate surface which image is displayed on a liquid crystal panel and reflected at an interface of a panel surface. Further, recognition of such an image by the optical sensor elements can be reduced. This allows for more precise detection of a position.

In the liquid crystal display device of the present invention, the quarter wave plate has a slow axis, the slow axis being disposed so as to be inclined at an angle of 45° with respect to a polarization transmission axis of the polarizing plate provided closer to the image display surface than the other polarizing plate.

According to the foregoing configuration, it is possible to more greatly reduce reflected light from an object (referred to as an input object) such as a finger or an input pen for making an input onto the panel surface.

In an illumination device of the present invention, the reflectance changing section further includes a support that supports the two elastic films.

According to the foregoing configuration, it is possible to more easily handle a reflectance changing section because a shape of the reflectance changing section is more stable, as compared to a case where the reflectance changing section is made of only the elastic films which are soft and unstable in shape.

Note that the support is preferably made of a transparent substrate having rigidity, a transparent film having less elasticity than the elastic films, or the like.

In the illumination device of the present invention, the distance retention section is provided plurally and randomly between the two elastic films.

According to the foregoing configuration, it is possible to prevent occurrence of moiré. This can prevent deterioration in display quality.

In order to solve the problem mentioned above, an area sensor of the present invention detecting an external input position by detecting an image on a detection target surface, the area sensor comprising: a position detecting section (i) including a plurality of optical sensor elements each detecting an intensity of received light and (ii) detecting the external input position according to detection of the image on the detection target surface by use of the plurality of optical sensor elements; a light emitting section illuminating the position detecting section from a backside of the position detecting section; and a reflectance changing section reducing a reflectance of the light from the light emitting section in response to application of pressure on the detection target surface, the reflectance changing section including at least two elastic films, and the reflectance changing section being configured so that in a state where no pressure is applied on the detection target surface, an air layer is formed between the two elastic films whereas in a case where pressure is applied on the detection target surface, the two elastic films contact each other.

In the foregoing configuration, the light emitting section illuminates the position detecting section from a backside of the position detecting section. This means that the light emitting section illuminates the position detecting section from a side (of the position detecting section) opposite to the detection target surface.

According to the foregoing configuration, when a finger, an input pen or the like touches the panel surface and applies pressure on the panel surface, the two elastic films of the reflectance changing section contact each other. Therefore, the air layer that is formed between the two elastic films disappears. This eliminates a reflection effect of light that occurs at a boundary surface between each elastic film and the air layer. As a result, a reflectance in a position where the two elastic films contact each other is reduced. Accordingly, an amount of reflected light among light from the backlight is reduced in an optical sensor element provided in a position where pressure is applied, as compared to an optical sensor element provided in a position where no pressure is applied. As a result, a darker image is detected in the position where pressure is applied than in the position where no pressure is applied.

According to the foregoing configuration, it is therefore possible to precisely distinguish a case where a finger, an input pen or the like touches the detection target surface from a case where a finger, an input pen or the like does not touch the detection target surface.

Further, as described above, the reflectance changing section is made of the two elastic films and the air layer that is formed between the two elastic films (the elastic films are flat in shape and each has a flat surface which faces the air layer). This reduces factors causing light scattering. As such, it is possible to suppress deterioration in display quality in a case where the area sensor is combined with a display panel. Furthermore, according to the foregoing configuration, the reflectance changing section is made of the two flat elastic films. This requires no high accuracy in forming the reflectance changing section. It is therefore possible to produce the reflectance changing section at low cost.

Furthermore, as described above, when the reflectance changing section is made of the two elastic films and the air layer that is formed between the two elastic films, it is possible to control a reflectance by controlling refractive indices of the elastic films. This makes it possible to increase the range in which the reflectance changes between the case where the panel surface is touched and the case where the panel surface is not touched, without increasing a HAZE.

Each of the elastic films may be a film made of silicon rubber or the like.

In the area sensor of the present invention, the reflectance changing section is provided with a distance retention section on at least one of the two elastic films, the distance retention section being for forming the air layer.

According to the foregoing configuration, it is possible to reliably form the air layer between the two elastic films in a state where no pressure is applied on the panel surface.

In the area sensor of the present invention, the reflectance changing section further includes a support that supports the two elastic films.

According to the foregoing configuration, it is possible to more easily handle the reflectance changing section because a shape of the reflectance changing section is more stable, as compared to a case where the reflectance changing section is made of only the elastic films which are soft and unstable in shape.

Note that the support is preferably made of a transparent substrate having rigidity, a transparent film having less elasticity than the elastic films, or the like.

A display device of the present invention includes a display panel including any one of the area sensors described above.

According to the foregoing configuration, it is possible to achieve a display device having an area sensor function that can reliably distinguish a case where a finger or an input pen touches a detection target surface from a case where a finger or an input does not touch the detection target surface, by provision of any one of the foregoing area sensors.

In a case where the display device is a liquid crystal display device, a backlight of the liquid crystal display device serves as the light emitting section of the area sensor. Further, in a case where the display device is an electroluminescent (EL) display device, an electroluminescent layer of the electroluminescent (EL) display device serves as the light emitting section of the area sensor.

Further, an optical sensor element provided in the position detecting section of the area sensor may be provided monolithically with a switching element provided on the active matrix substrate of the display panel.

For a fuller understanding of the nature and advantages of the invention, reference should be made to the ensuing detailed description taken in conjunction with the accompanying drawings.

BRIEF DESCRIPTION OF DRAWINGS

FIG. 9 is a diagram schematically showing a state in which light that has passed through the ¼λ phase plate is reflected by an input object and the light then passes back through the ¼λ phase plate, in the liquid crystal display device shown in FIG. 7.

FIG. 10 is a diagram schematically showing polarization states of light at positions shown in FIG. 9 in a case where the front polarizing plate and the ¼λ phase plate are disposed in a positional relationship shown in FIG. 8.

FIG. 11 is a graph showing a relationship between a crossing angle θ and a reducing effect on reflected light from an input object, which crossing angle θ is an angle at which a transmission axis of a front polarizing plate and a slow axis of a ¼λ phase plate cross each other. The front polarizing plate and the ¼λ phase plate are provided in the liquid crystal display device shown in FIG. 7.

FIG. 12(a) of FIG. 12 is a diagram schematically showing a state in which light that has exited from a liquid crystal panel is reflected at an interface of a panel surface, in a liquid crystal display device that includes no ¼λ phase plate. (b) of FIG. 12 is a diagram schematically showing a state in which light that has been exited from a liquid crystal panel is reflected at an interface of a panel surface, in the liquid crystal display device shown in FIG. 7. (c) of FIG. 12 is a diagram schematically showing polarization states of light in positions shown in (a) and (b) of FIG. 12.

FIGS. 13(a) and (b) are diagrams schematically showing a relationship between an image displayed on a liquid crystal panel and an image recognized by an area sensor, in a liquid crystal display device that includes no ¼λ phase plate.

DESCRIPTION OF EMBODIMENTS

First Embodiment

The following describes an embodiment of the present invention with reference to FIGS. 1 to 5. Note that the present invention is not limited to this embodiment.

The present embodiment describes a liquid crystal display device integrated with a touch panel having an area sensor function (specifically, a touch panel function).

Figure 1:
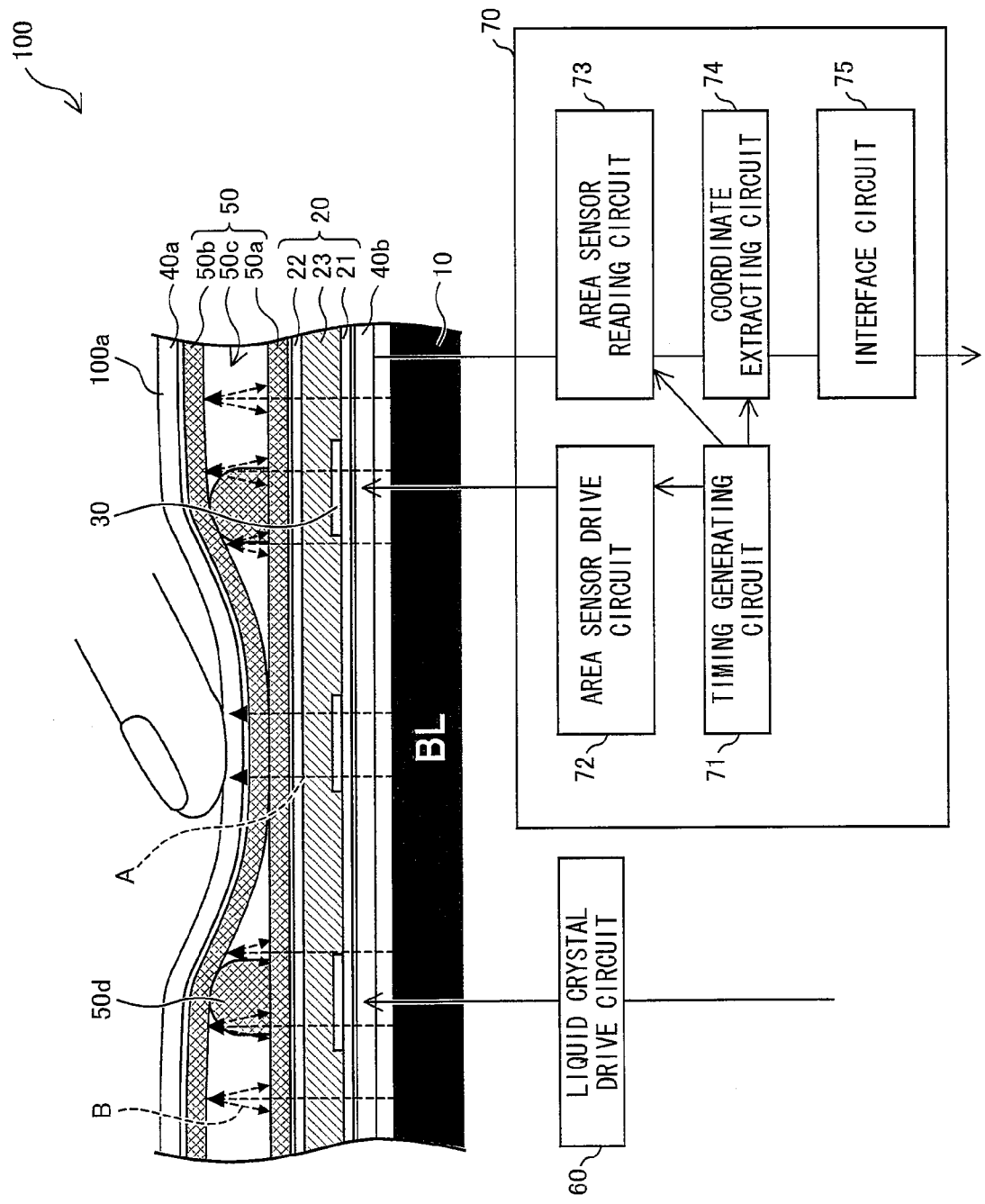
FIG. 1 is a diagram schematically showing a configuration of a liquid crystal display device according to an embodiment of the present invention.

The following discusses a configuration of a liquid crystal display device integrated with a touch panel of the present embodiment with reference to FIG. 1. A liquid crystal display device 100 integrated with a touch panel (which is also simply called a liquid crystal display device 100) shown in FIG. 1 has a touch panel function in which an optical sensor element provided in each pixel detects an image on a surface of a display panel so that an input position is detected.

As shown in FIG. 1, the liquid crystal display device 100 integrated with a touch panel of the present embodiment includes a liquid crystal panel 20 (position detecting section) and a backlight 10 (light emitting section) which is provided on a backside of the liquid crystal panel 20 and which illuminates the liquid crystal panel.

The liquid crystal panel 20 includes: an active matrix substrate 21 in which a plurality of pixels are arrayed in a matrix form; a counter substrate 22 disposed so as to face the active matrix substrate 21; and a liquid crystal layer 23, as a display medium, sandwiched between the active matrix substrate 21 and the counter substrate 22. Note that, in the present embodiment, a display mode of the liquid crystal panel 20 is not particularly limited and various display modes such as a TN mode, an IPS mode and a VA mode can be used.

Further, the liquid crystal display device 100 is provided with a front polarizing plate 40a (which is a polarizing plate provided closer to an image display surface than a back polarizing plate 40b) and the back polarizing plate 40b so that the liquid crystal panel 20 is between the front polarizing plate 40a and the back polarizing plate 40b.

The polarizing plates 40a and 40b each serves as a polarizer. For example, in a case where a liquid crystal material sealed in a liquid crystal layer is a vertical alignment type liquid crystal material, a liquid crystal display device of a normally black mode can be attained by arranging a polarization direction of the front polarizing plate 40a and a polarization direction of the back polarizing plate 40b in crossed Nicols.

Furthermore, between the front polarizing plate 40a and the liquid crystal panel 20, a reflectance changing section 50 is provided. The reflectance changing section 50 reduces a reflectance of light from the backlight 10 in response to application of pressure on a surface (detection target surface 100a of a touch panel) of the device. The detection target surface 100a is also called a panel surface.

The active matrix substrate 21 is provided with TFTs (not shown) each of which is a switching element for driving a corresponding pixel, an alignment film (not shown) and optical sensor elements 30 and the like.

Further, on the counter substrate 22, a color filter layer, a common electrode, an alignment film and the like which are not shown in FIG. 1 are formed. The color filter layer includes a black matrix and colored sections each having red (R), green (G) or blue (B) color.

As described above, the liquid crystal display device 100 integrated with a touch panel of the present embodiment includes an optical sensor element 30 in each pixel region. This can provide an area sensor. Accordingly, when a finger or an input pen touches a specific position of the surface (detection target surface 100a) of the liquid crystal panel 20, the optical sensor elements 30 can read the position and input information to the device or cause an intended operation to be carried out. Thus, the liquid crystal display device 100 of the present embodiment can provide a touch panel function by use of the optical sensor elements 30.

The optical sensor element 30 is made of a photodiode or a phototransistor, and detects an amount of received light by causing an electric current flow in accordance with an intensity of the received light. The TFTs and the optical sensor elements 30 may be monolithically provided on the active matrix substrate 21 by use of a substantially identical process. That is, a part of members constituting the optical sensor elements 30 and a part of members constituting the TFTs may be formed together. Such optical sensor elements can be formed according to a conventionally well-known method for manufacturing a liquid crystal display device including optical sensor elements.

In the present invention, the optical sensor element may not be necessarily provided in each pixel. The present invention encompasses a configuration in which an optical sensor is provided, for example, in each of pixels having any one of color filters of R, G and B.

Further, the liquid crystal display device of the present invention may include a front phase plate and a back phase plate (which are not shown in FIG. 1) as optical compensation elements in such a manner that the active matrix substrate 21 and the counter substrate 22 are between the front phase plate and the back phase plate.

FIG. 1 also shows a liquid crystal drive circuit 60 that performs display drive on the liquid crystal panel 20 and an area sensor control section 70 that drives the area sensor. FIG. 1 also shows a configuration inside the area sensor control section 70. Note that the liquid crystal drive circuit and the area sensor control section of the present embodiment can be configured in a conventionally well-known configuration.

As shown in FIG. 1, the area sensor control section 70 includes a timing generating circuit 71, an area sensor drive circuit 72, an area sensor reading circuit 73, a coordinate extracting circuit 74 and an interface circuit 75.

The timing generating circuit 71 generates a timing signal for controlling the circuits to operate in synchronization with one another.

The area sensor drive circuit 72 supplies an electric source for driving the optical sensor elements 30.

The area sensor reading circuit 73 (i) receives a received-light signal from the optical sensor elements 30 each of which causes a flow of an electric current whose value differs depending on an amount of received light and then (ii) calculates the amount of received light.

The coordinate extracting circuit 74 calculates coordinates of a finger that touches the surface (detection target surface 100a) of the liquid crystal panel, based on the amount of received light of the optical sensor elements 30 which amount of received light is calculated by the area sensor reading circuit 73.

The interface circuit 75 outputs information of the coordinates of the finger calculated by the coordinate extracting circuit 74 to other control section (for example, the liquid crystal drive circuit 60 or the like) of the liquid crystal display device 100.

The liquid crystal display device 100 has the above-mentioned configuration. This allows the optical sensor elements 30 formed in the liquid crystal panel 20 to recognize a finger or an input pen as an image in a case where the finger or the input pen touches the surface (detection target surface 100a) of the device. Thus, the liquid crystal display device 100 can detect an input position.

Further, the liquid crystal display device 100 of the present embodiment includes the reflectance changing section 50. This reduces a reflectance of light from the backlight 10, when a finger, an input pen or the like touches the detection target surface 100a and pressure is applied on the detection target surface 100a. Thus, the liquid crystal display device 100 of the present embodiment can precisely detect whether or not a finger or an input pen touches the panel surface.

Figure 2:
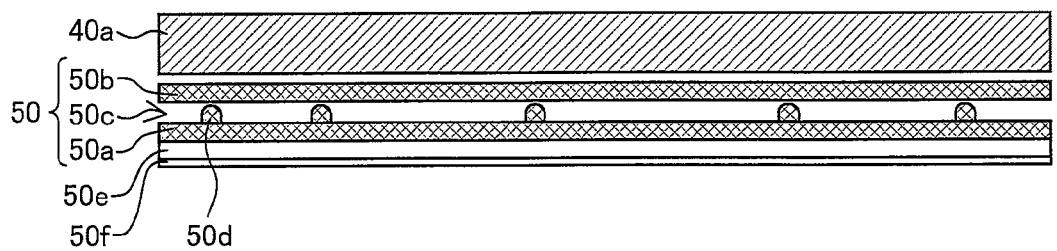
FIG. 2 is a cross sectional view showing a configuration of a reflectance changing section provided in the liquid crystal display device shown in FIG. 1.

FIG. 2 shows a more concrete configuration of the reflectance changing section 50. FIG. 2 also shows a front polarizing plate 40a.

As shown in FIGS. 1 and 2, the reflectance changing section 50 includes two flat elastic films 50a and 50b and an air layer 50c that is formed between the elastic films 50a and 50b. The air layer 50c is produced in a state where no pressure is applied on the detection target surface 100a. That is, as shown in FIG. 1, the air layer 50c disappears in a section where a finger or the like applies pressure on the detection target surface 100a. This is because the upper elastic film 50b is pressed toward the lower elastic film 50b so that a surface of the upper elastic film 50b comes in contact with a surface of the lower elastic film 50a.

Further, projections (distance retention sections) 50d are provided on the lower elastic film 50a of the reflectance changing section 50 of the present embodiment, for forming the air layer 50c. This allows the air layer 50c to be reliably formed between the two elastic films 50a and 50b in a state where no pressure is applied on the detection target surface 100a. Note that, in the present embodiment, a configuration in which the projections 50d are provided on the lower elastic film 50a is described as an example. However, the present invention is not limited to this configuration. Such projections may be provided on the upper elastic film 50b, or the projections may be provided on both the lower elastic film 50a and the upper elastic film 50b.

Furthermore, as shown in FIG. 2, a support film 50e (support) is provided on another surface of the lower elastic film 50a of the reflectance changing section 50. The another surface faces the liquid crystal panel 20. The support film 50e is made of a transparent film or the like whose elasticity is less than those of the elastic films 50a and 50b, and supports the elastic films 50a and 50b. Provision of the support film 50e allows the reflectance changing section 50 to be easily handled, because a shape of the reflectance changing section 50 is more stable as compared to a case where the reflectance changing section 50 is made of only the elastic films 50a and 50b which are soft and unstable in shape. As a result, displacement of the reflectance changing section 50 becomes difficult to occur when the reflectance changing section 50 is being disposed on the liquid crystal panel 20.

Moreover, as shown in FIG. 2, a glue layer 50f is provided on a surface of the support film 50e which surface faces the liquid crystal panel 20. By the glue layer 50f, the reflectance changing section 50 is attached to the liquid crystal panel 20 (not shown in FIG. 2).

Materials of the elastic films 50a and 50b are not limited as long as the materials have elasticity. However, it is preferable that silicon rubber or the like is used as the materials. It is also preferable that a transmittance of each of the elastic films 50a and 50b is 90% or more and that a refractive index of each of the elastic films 50a and 50b ranges from 1.4 to 1.6. Note that the material of the elastic film 50a may be identical to or different from that of the elastic film 50b.

If the refractive index of the elastic film 50a is identical to that of the elastic film 50b, all light passes through the reflectance changing section 50 when the elastic film 50a contacts the elastic film 50b. Therefore, it is preferable that a value of the refractive index of the elastic film 50a is identical to that of the elastic film 50b. This makes it possible to more reliably detect whether or not a finger or an input pen touches the panel surface.

The reflectance changing section 50 has the above-described configuration. This reduces a reflectance of light from the backlight 10, when a finger or the like touches the detection target surface 100a and applies pressure on the detection target surface 100a. This point is described below with reference to FIGS. 3 and 4.

Figure 3:
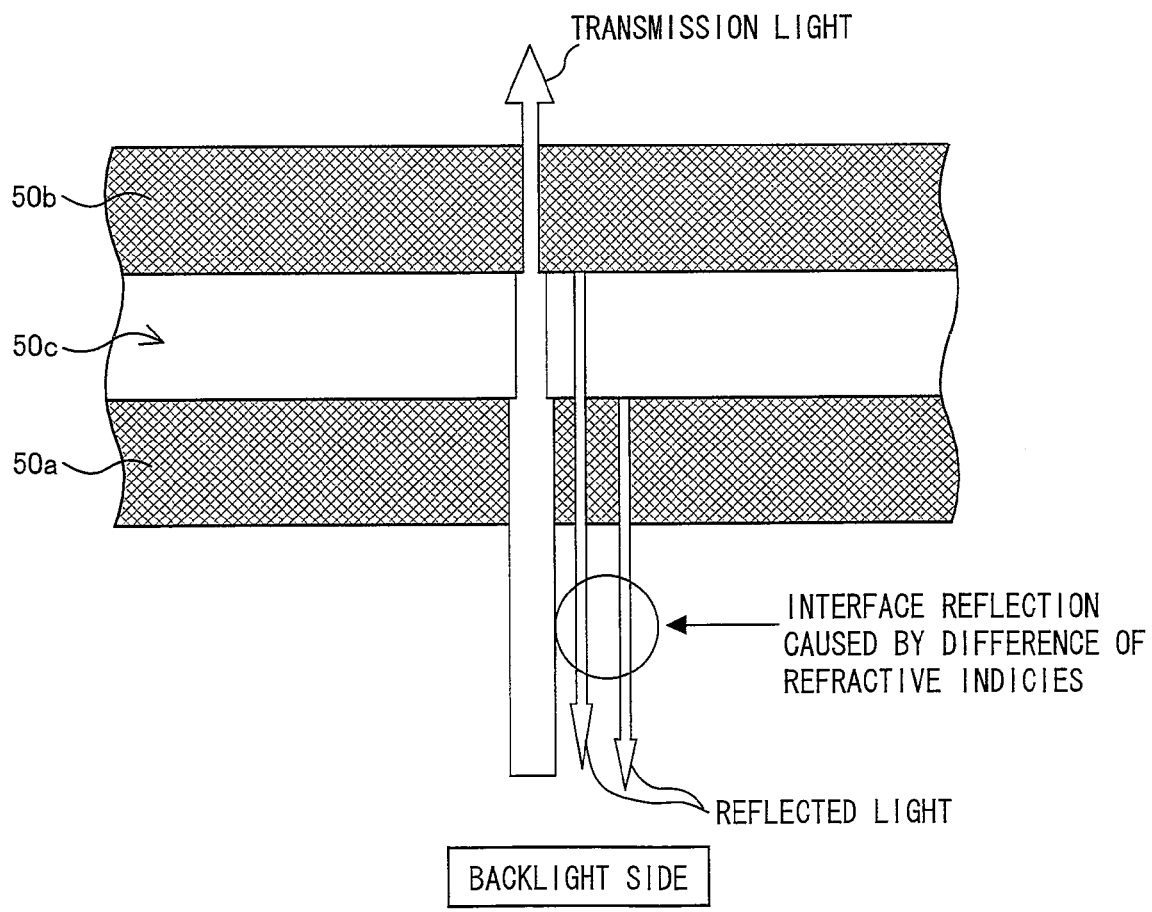
FIG. 3 is an enlarged view of a part of the reflectance changing section shown in FIG. 2 in a state where no pressure is applied on a panel surface.
Figure 4:
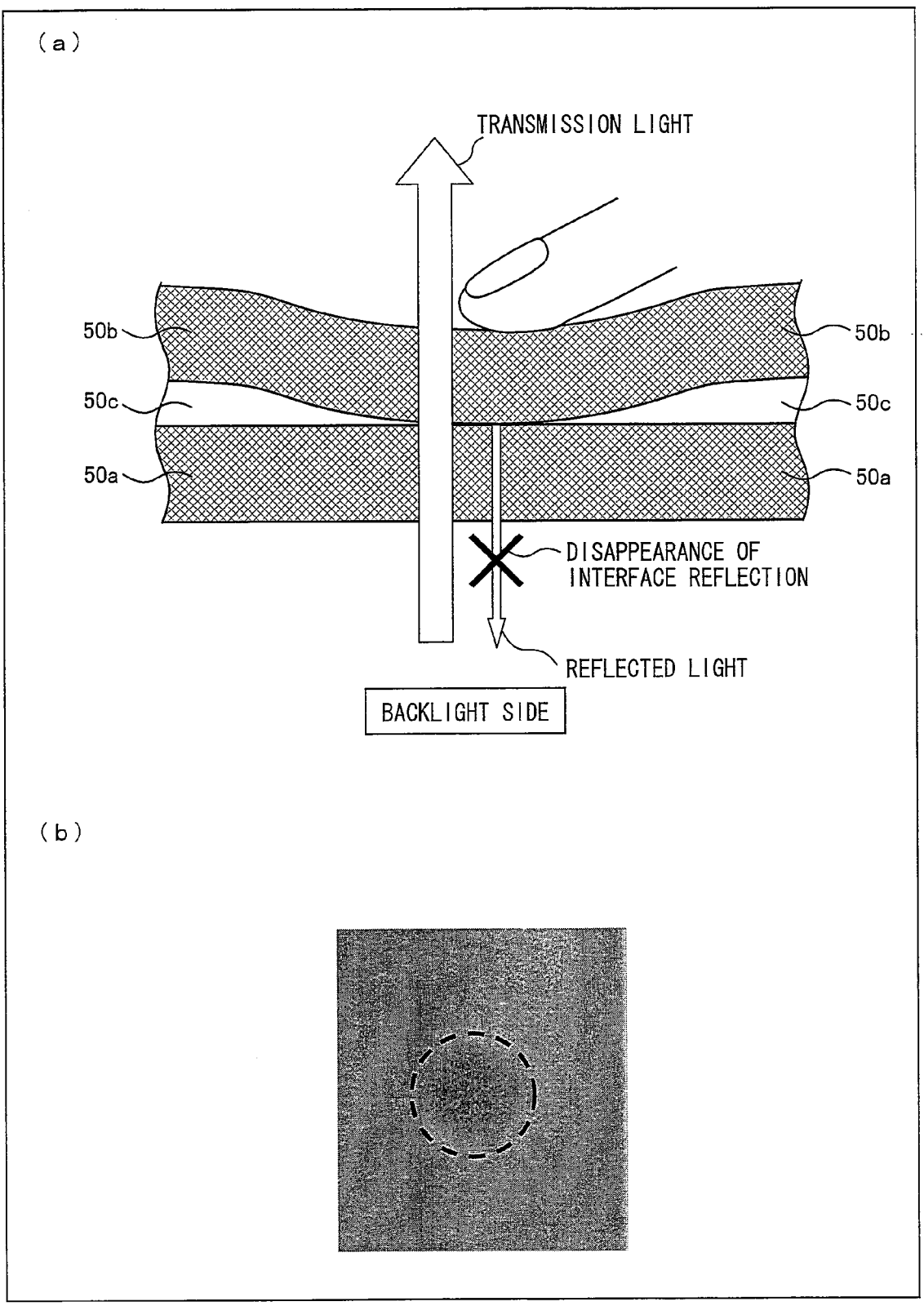
FIG. 4(a) of FIG. 4 is an enlarged view of a part of the reflectance changing section shown in FIG. 2 in a state where pressure is applied on a panel surface, and (b) of FIG. 4 is a diagram schematically showing an image detected by an optical sensor element when a finger touches a panel surface.

FIG. 3 is an enlarged view of a part of the reflectance changing section 50 shown in FIG. 2, in a state where no pressure is applied on the panel surface. (a) of FIG. 4 is an enlarged view of a part of the reflectance changing section 50 shown in FIG. 2, in a state where pressure is applied on the panel surface.

As shown in FIG. 3, in the state where no pressure is applied on the detection target surface 100a, the surface of the upper elastic film 50b (which is provided closer to the front polarizing plate 40a than the lower elastic film 50a) which surface faces the lower elastic film 50a is not in contact with a surface of the lower elastic film 50a (which is provided closer to the liquid crystal panel 20 than the upper elastic film 50b) which surface faces the upper elastic film 50b. That is, the air layer 50c is formed between the elastic films 50a and 50b.

FIG. 3 shows light (transmission light) which passes through the reflectance changing section 50 and light (reflected light) which is reflected at respective interfaces in the reflectance changing section 50. Here, the transmission light and the reflected light are light having entered the reflectance changing section 50 from a backside (backlight 10).

The elastic films 50a and 50b each is made of a material having a refractive index n that is different from that of the air. Therefore, in a state where no pressure is applied on the detection target surface 100a, two interfaces having different refractive indices are produced in the reflectance changing section 50. One of the two interfaces is produced between the lower elastic film 50a and the air layer 50c, and the other of the two interfaces is produced between the air layer 50c and the upper elastic film 50b. As shown in FIG. 3, a part of light that is emitted from the backlight 10 is reflected at the two interfaces. Therefore, an amount of the transmission light reduces every time the transmission light passes through the interfaces.

Accordingly, in the state where no pressure is applied on the detection target surface 100a, the light that has been emitted from the backlight 10 is separated into the light that passes through the reflectance changing section 50 and the light that is reflected within the reflectance changing section 50.

The following describes a state where a finger or the like touches the detection target surface 100a and applies pressure on the reflectance changing section 50, with reference to (a) of FIG. 4.

As shown in (a) of FIG. 4, in a case where pressure is applied, in a direction of an arrow X, on the reflectance changing section 50, the upper elastic film 50b and the projections 50d (not shown in (a) of FIG. 4) are compressed. This causes the upper elastic film 50b to come in contact with the lower elastic film 50a in a position on which the pressure is applied.

In this case, the following change occurs in a light path of the light from the backlight 10. The air layer 50c disappears in the position where the elastic film 50a contacts the elastic film 50b. This causes disappearance of (i) the light that is reflected at a boundary surface between the elastic film 50a and the air layer 50c and (ii) the light that is reflected at a boundary surface between the air layer 50c and the elastic film 50b. Accordingly, interface reflection occurs only at a boundary surface between the elastic film 50a and the elastic film 50b. This drastically reduces an amount of reflected light.

Further, when the refractive index of the elastic film 50a is identical to that of the elastic film 50b, all light passes through the reflectance changing section 50 and enters the front polarizing plate 40a in the position where the elastic film 50a contacts the elastic film 50b.

Such an effect causes reduction of the reflectance of the light from the backlight 10 within the reflectance changing section 50, in response to application of pressure on the detection target surface 100a.

As described above, the reflectance changing section 50 provided in the liquid crystal display device 100 is configured in such a manner that the reflectance of the light from the backlight 10 differs between a case where pressure is applied on the panel surface (detection target surface 100a) and a case where no pressure is applied on the panel surface. Specifically, the reflectance changing section 50 reduces the reflectance of the light from the backlight 10 in the case where pressure is applied on the detection target surface 100a, as compared to the case where no pressure is applied on the detection target surface 100a.

(b) of FIG. 4 is a diagram schematically showing an image detected by the optical sensor elements 30 when a finger touches the panel surface. In a region (region surrounded by a dashed line in (b) of FIG. 4) where the finger touches the detection target surface 100a, the reflectance changing section 50 reduces the reflectance of the light from the backlight 10 and most light pass through the reflectance changing section 50. This reduces an amount of light detected by the optical sensor elements 30 in the region. Therefore, as shown in (b) of FIG. 4, a darker image is detected in the region where the finger touches the detection target surface 100a, as compared to other regions.

Figure 5:
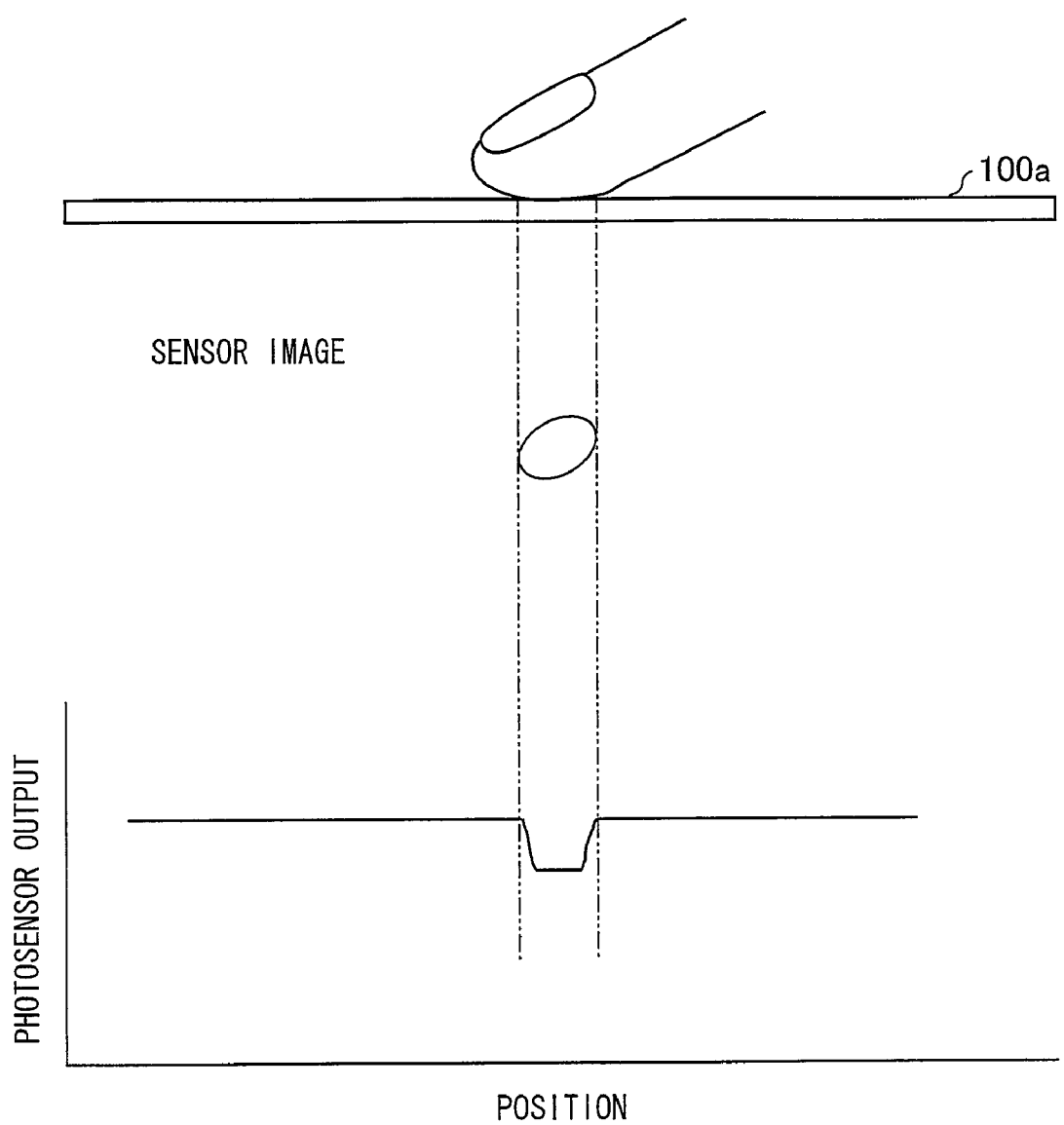
FIG. 5 is a diagram schematically showing outputs of optical sensor elements when a finger touches a panel surface of the liquid crystal display device shown in FIG. 1.

FIG. 5 schematically shows outputs of the optical sensor elements 30 when a finger touches the panel surface of the liquid crystal display device 100. As shown in a graph of FIG. 5, the outputs of the optical sensor elements 30 are reduced only in a position where the finger touches the panel surface. This reduction in the outputs is caused by reduction of the reflectance of the light from the backlight.

Figure 16:
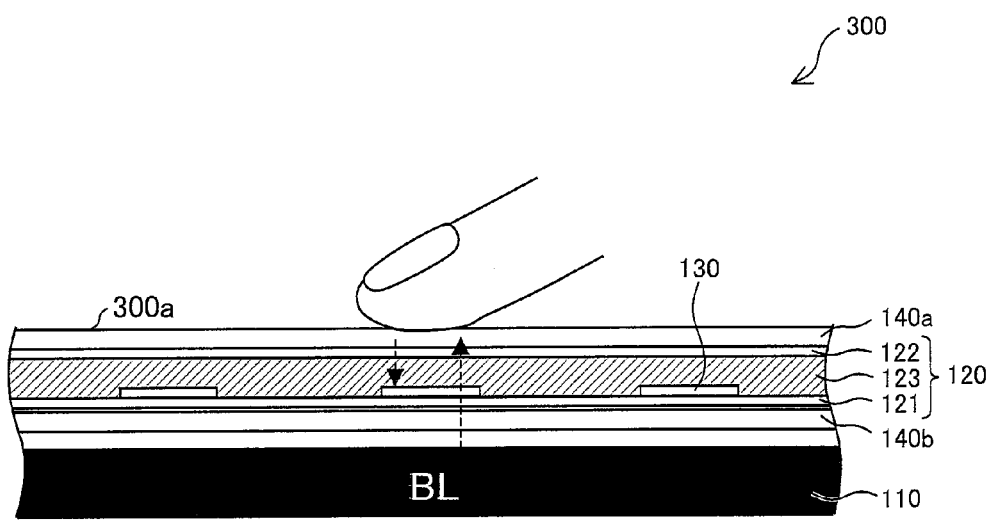
FIG. 16 is a cross sectional view showing a configuration of a conventional liquid crystal display device including an area sensor.

The following describes, for comparison, a configuration of a conventional liquid crystal display device integrated with a touch panel having an area sensor function. FIG. 16 shows a configuration of a conventional liquid crystal display device 300 integrated with a touch panel.

As shown in FIG. 16, the conventional liquid crystal display device 300 integrated with a touch panel (which is also simply called a liquid crystal display device 300) includes a liquid crystal panel 120 and a backlight 110 which is provided on a backside of the liquid crystal panel 120 and which illuminates the liquid crystal panel.

The liquid crystal panel 120 includes: an active matrix substrate 121 in which a plurality of pixels are arrayed in a matrix form; a counter substrate 122 provided so as to face the active matrix substrate 121; and a liquid crystal layer 123, as a display medium, sandwiched between the active matrix substrate 121 and the counter substrate 122.

Further, a front polarizing plate 140a and a back polarizing plate 140b are provided so that the liquid crystal panel 120 is between the front polarizing plate 140a and the back polarizing plate 140b.

The active matrix substrate 121 is provided with TFTs (not shown) each of which is a switching element for driving a corresponding pixel, an alignment film (not shown), optical sensor elements 130 and the like.

In the liquid crystal display device 300, in a case where a finger or an input pen touches a detection target surface 300a, the finger or the input pen is recognized as an image and an input position is then detected, by use of light from the backlight 110 as a light source. That is, by using transmission light which has been emitted from the backlight 110 and which has passed through the liquid crystal panel 120, the optical sensor elements 130 detect light that is reflected by an object on the detection target surface 300a among the transmission light. Thus, the liquid crystal display device 300 detects the position of the finger or the input pen as image data.

Here, when the configuration of the liquid crystal display device 100 of the present embodiment is compared to that of the conventional liquid crystal display device 300, the conventional liquid crystal display device 300 is different from the liquid crystal display device 100 of the present embodiment in that the conventional liquid crystal display device 300 includes no reflectance changing section. That is, the liquid crystal display device 300 only detects, simply as image data, an object that is present on the detection target surface 300a.

Figure 17:
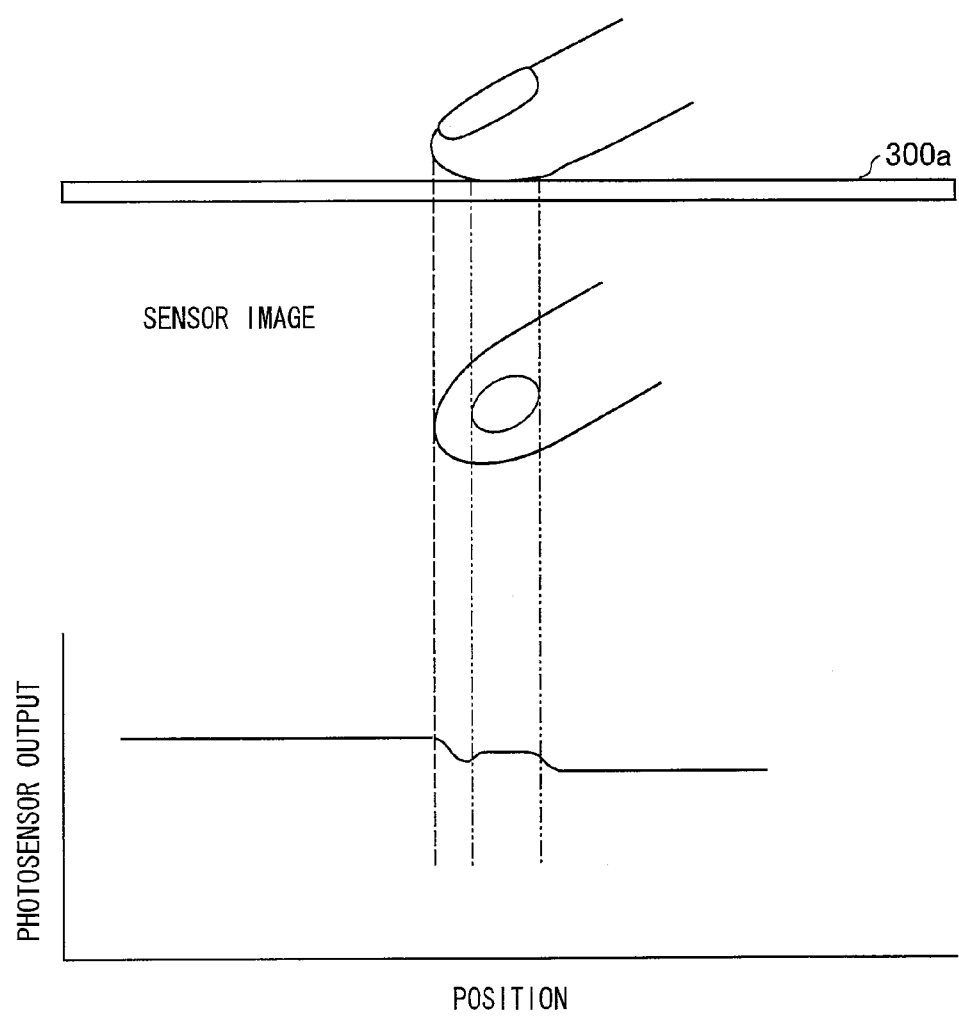
FIG. 17 is a diagram schematically showing outputs of optical sensor elements when a finger touches a panel surface of the liquid crystal display device shown in FIG. 16.

FIG. 17 schematically shows outputs of optical sensor elements 130 when a finger touches the panel surface of the liquid crystal display device 300. As shown in a graph of FIG. 17, the outputs of the optical sensor elements 130 tend to slightly reduce in a region where the finger is present on the detection target surface 300a, as compared to a region where a finger is not present on the detection target surface 300a. However, difference in outputs between the region where the finger is present and the region where the finger is not present is small. Further, because the conventional liquid crystal display device 300 includes no reflectance changing section, whether or not a finger or the like touches the detection target surface 300a cannot be precisely distinguished. Accordingly, detection accuracy of the optical sensor elements 130 is not sufficient for precisely specifying an input position of a finger, an input pen or the like.

Moreover, in a case where a display device like the liquid crystal display device 300 uses, as a light source, a light emitting section such as a backlight which is provided on a backside of the optical sensor elements and detects an image on a panel surface by use of reflected light from an object on the panel surface, an amount of reflected light reduces when the display device displays a dark image such as a black display. This greatly reduces detection sensitivity of an optical sensor.

On the other hand, in the liquid crystal display device 100 of the present embodiment, as shown in an arrow B in FIG. 1, most light from the backlight 10 is reflected within the reflectance changing section 50 in a region where a finger or the like does not touch the panel surface (detection target surface 100a). Meanwhile, as shown in an arrow A in FIG. 1, most light from the backlight 10 passes through the reflectance changing section 50 in a region where a finger or the like touches the panel surface (detection target surface 100a). This reduces a reflectance of the light. Accordingly, the liquid crystal display device 100 can more precisely distinguish a case where a finger, an input pen or the like touches the panel surface from a case where a finger, an input pen or the like does not touch the panel surface, as compared to the conventional liquid crystal display device including an area sensor.

Further, the reflectance changing section 50 is made of two elastic films that are flat except in sections provided with the projections 50d. This reduces factors that cause light scattering. It is therefore possible to suppress deterioration caused in display quality of the liquid crystal panel 20 by provision of the reflectance changing section 50.

Furthermore, the reflectance changing section 50 is provided on an inner side (that is, closer to the liquid crystal panel 20) with respect to the front polarizing plate 40a. Therefore, an amount of light that passes through the reflectance changing section 50 does not depend on a display state of the liquid crystal panel 20 (that is, a display state regarding whether the liquid crystal panel 20 displays a bright image or a dark image). This allows detection performance of the optical sensor elements 30 to be kept constant regardless of the display state of the liquid crystal panel 20.

Moreover, in the reflectance changing section 50, the projections 50d (distance retention sections) are provided integrally with the elastic film 50a. The projections 50d each is for retaining a constant distance between two elastic films (elastic film 50a and elastic film 50b) in a state where no pressure is applied on the detection target surface 100a. This allows the air layer 50c to be reliably formed between the two elastic films 50a and 50b in the state where no pressure is applied on the detection target surface 100a.

Note that a size of each of the projections 50d is preferably arranged such that a maximum diameter of a cross section is 15 μm or less, for preventing damage to the display quality of the liquid crystal panel 20.

Further, in a case where the plurality of projections 50d are regularly arranged, interference between pixels of the liquid crystal panel 20 may cause moiré. This may damage the display quality. Therefore, it is preferable that the plurality of projections 50d are randomly arranged. It is also preferable that a density of the arranged projections 50d is a value in which a HAZE is less than 20% (that is, 1000 projections/mm$^2$). The projections 50d arranged at such a density can suppress deterioration in the display quality of the liquid crystal panel 20.

Here, the HAZE is a value calculated by the following expression.

$$HAZE(\%) = Td/Tt \times 100$$

(Td: diffusion transmittance, Tt: all light transmittance)

This means, in a case where a light source emits parallel light, (1−HAZE) (%) of light passes through a surface at right angle with respect to the surface whereas and HAZE (%) of light proceeds in directions other than at the right angle with respect to the surface (HAZE (%) of light scatters).

Therefore, as a HAZE value increases, disadvantages such as hazy (blurred) display, reduction in contrast, dark display and the like occur.

Furthermore, provision of the foregoing projections 50d makes it possible to improve detachability between the elastic film 50a and the elastic film 50b, when pressure is released after a finger, an input pen or the like applies pressure on the detection target surface 100a and the elastic film 50a comes in contact with the elastic film 50b. This can prevent the elastic film 50a and the elastic film 50b from staying stuck to each other after an input to an area sensor is completed.

Figure 6:
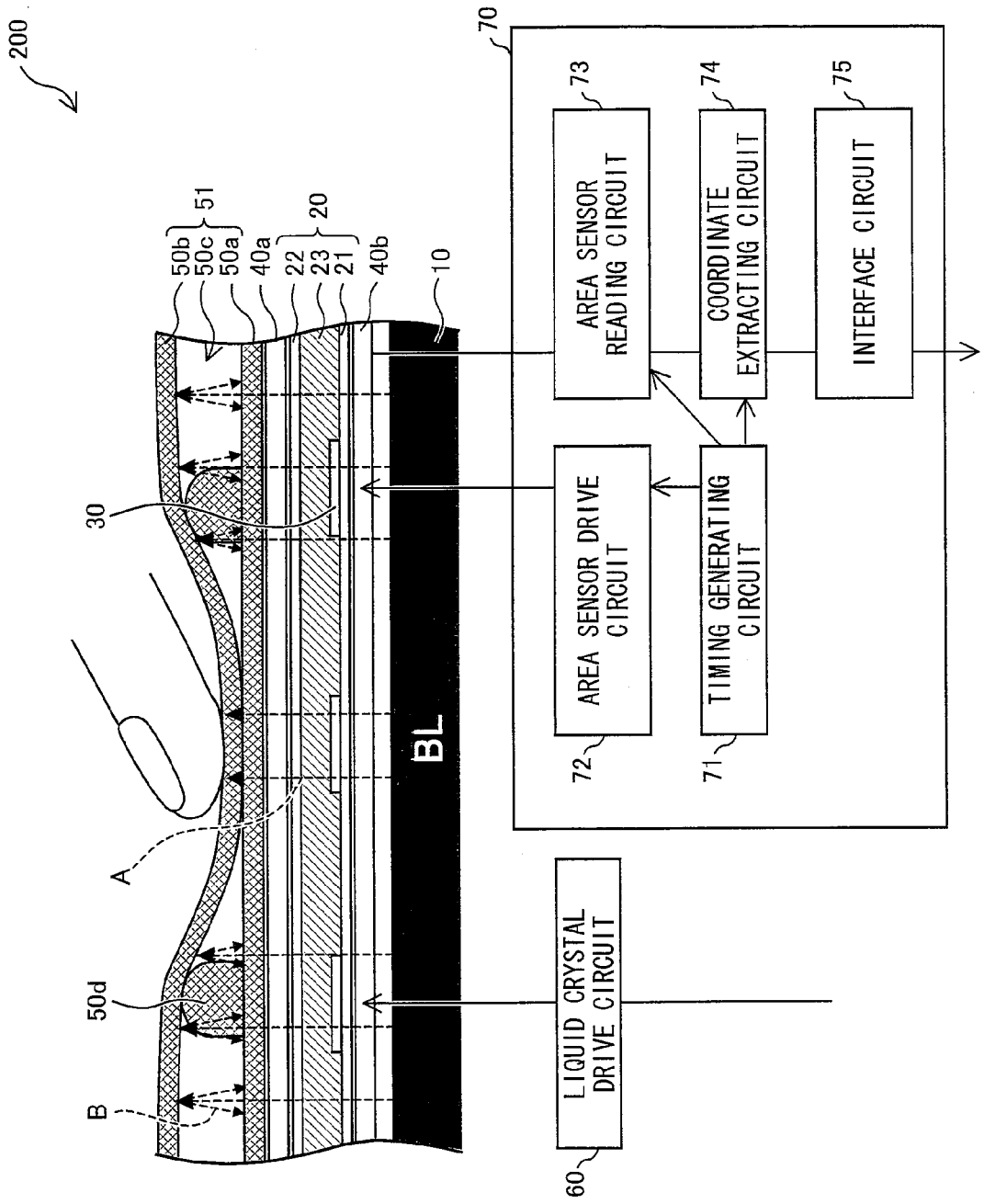
FIG. 6 is a diagram schematically showing another example of a configuration of a liquid crystal display device of the present invention.

The foregoing embodiment describes, as an example, a configuration in which the reflectance changing section 50 is provided below the front polarizing plate 40a. However, the present invention is not limited to this configuration. FIG. 6 shows another configuration of the present invention.

In a liquid crystal display device 200 shown in FIG. 6, a reflectance changing section 51 is provided above a front polarizing plate 40a. A concrete configuration of the reflectance changing section 51 is identical to that of the reflectance changing section 50 of the liquid crystal display device 100. The liquid crystal display device 200 shown in FIG. 6 has a configuration identical to that of the liquid crystal display device 100 except how to arrange the front polarizing plate 40a and the reflectance changing section 51, and therefore an explanation thereof is omitted here.

According to the foregoing configuration, as shown in an arrow B in FIG. 6, most light from a backlight 10 is reflected within the reflectance changing section 51 in a region where a finger or the like does not touch a surface of the liquid crystal display device 200. Meanwhile, as shown in an arrow A in FIG. 6, most light from the backlight 10 passes through the reflectance changing section 51 in a region where a finger or the like touches the surface of the liquid crystal display device 200. This reduces a reflectance of the light in such a region where the finger or the like touches the surface. Accordingly, the liquid crystal display device 200 can detect whether a panel surface is touched or not more precisely than a conventional liquid crystal display device including an area sensor.

Note that the reflectance changing section is preferably provided below the front polarizing plate 40a for attaining an area sensor having high detection performance regardless of a display state of the liquid crystal display device (even in a case where a display state is dark).

Further, in the present embodiment, two elastic films including the elastic film 50a and the elastic film 50b in this order are provided on a support film 50e, and the air layer 50c is formed between the two elastic films. However, the present invention is not limited to this configuration as long as the reflectance changing section of the present invention includes at least two elastic films and an air layer that is formed between the two elastic films. Therefore, the present invention encompasses a configuration in which a reflectance changing section includes three or more elastic films and in which an air layer is formed between every two elastic films. As described above, in a case where the reflectance changing section includes a plurality of air layers, a range in which a reflectance of light changes between a case where a finger or the like touches a panel surface and a case where a finger does not touch the panel surface is widened, as compared to a case where the reflectance changing section includes a single air layer.

Second Embodiment

The following describes Second Embodiment of the present invention with reference to FIGS. 7 to 11. Note that the present invention is not limited to this embodiment.

The present embodiment describes an example of a configuration of a liquid crystal display device integrated with a touch panel having an area sensor function which configuration is different from that of the liquid crystal display device 100 described in First Embodiment.

Figure 7:
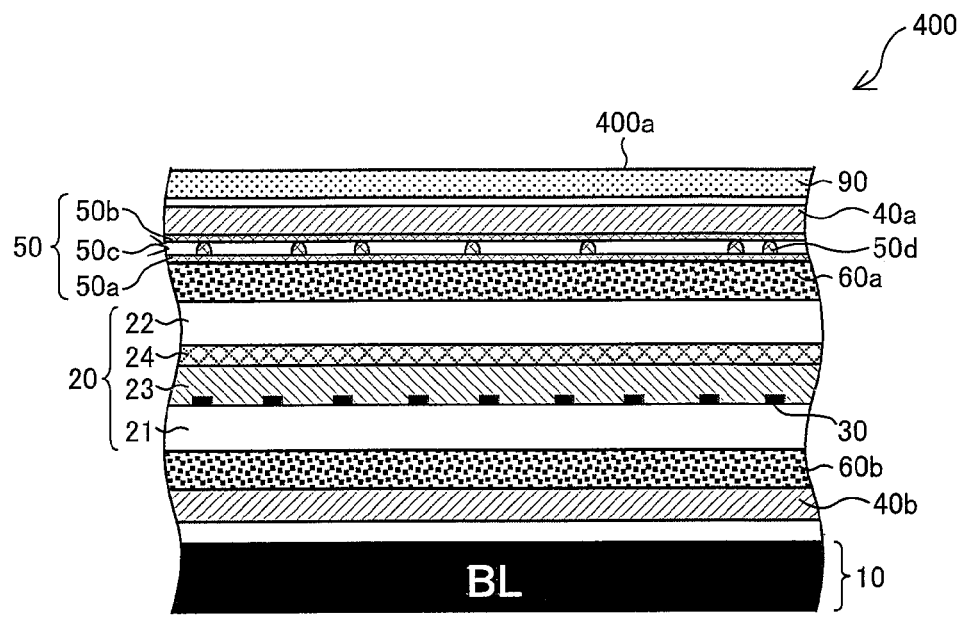
FIG. 7 is a cross sectional view showing a configuration of a liquid crystal display device according to Second Embodiment of the present invention.

FIG. 7 shows a configuration of a liquid crystal display device 400 integrated with a touch panel (which is also simply called a liquid crystal display device 400) according to the present embodiment.

As shown in FIG. 7, the liquid crystal display device 400 integrated with a touch panel of the present embodiment includes a liquid crystal panel 20 and a backlight 10 which is provided on a backside of the liquid crystal panel and which illuminates the liquid crystal panel.

The liquid crystal panel 20 includes: an active matrix substrate 21 in which a plurality of pixels are arrayed in a matrix form; a counter substrate 22 disposed so as to face the active matrix substrate 21; and a liquid crystal layer 23, as a display medium, sandwiched between the active matrix substrate 21 and the counter substrate 22.

Further, a front phase plate 60a and a back phase plate 60b are provided as optical compensation elements so that the counter substrate 22 and the active matrix substrate 21 are between the front phase plate 60a and the back phase plate 60b. The front phase plate 60a and the back phase plate 60b are provided for improving a transmittance and viewing angle characteristics, for example, in a case where a liquid crystal material sealed in a liquid crystal layer is a vertical alignment type. Note that, even if the liquid crystal display device 400 does not include these phase plates, the liquid crystal display device 400 can carry out display.

Furthermore, a front polarizing plate 40a and a back polarizing plate 40b are provided so that the front phase plate 60a and the back phase plate 60b are between the front polarizing plate 40a and the back polarizing plate 40b.

The polarizing plates 40a and 40b each serves as a polarizer. For example, in a case where the liquid crystal material sealed in the liquid crystal layer is the vertical alignment type, a liquid crystal display device of a normally black mode can be attained by arranging a polarization direction of the front polarizing plate 40a and a polarization direction of the back polarizing plate 40b in crossed Nicols.

Moreover, a reflectance changing section 50 is provided between the front polarizing plate 40a and the front phase plate 60a. The reflectance changing section 50 reduces a reflectance of light from the backlight 10 in response to application of pressure on a surface (detection target surface 400a of a touch panel) of the device. As shown in FIG. 7, the reflectance changing section 50 is configured so that an air layer 50c is formed between two elastic films 50a and 50b in a state where no pressure is applied on the detection target surface 400a and so that the two elastic films 50a and 50b contact each other in a state where pressure is applied on the detection target surface 400a. Further, projections 50d (distance retention sections) are formed on the elastic film 50a for reliably forming the air layer 50c. For a concrete configuration of the reflectance changing section 50, the configuration described in First Embodiment can be used. Therefore, description for the concrete configuration of the reflectance changing section 50 is omitted in this embodiment.

Further, in the liquid crystal display device 400 of the present embodiment, a ¼λ phase plate (quarter wave plate) 90 is provided so as to be closer to an image display surface than the front polarizing plate 40a. The ¼λ phase plate 90 generates ¼ wavelength phase difference in light.

The active matrix substrate 21 is provided with TFTs (not shown) each of which is a switching element for driving a corresponding pixel, an alignment film (not shown), optical sensor elements 30 and the like.

The counter substrate 22 is provided with a color filter layer 24, a common electrode (not shown), an alignment film (not shown) and the like. The color filter layer 24 includes a black matrix and colored sections each having red (R), green (G) or blue (B) color.

As described above, the liquid crystal display device 400 integrated with a touch panel of the present embodiment includes an optical sensor element in each pixel region. This makes it possible to attain an area sensor. Accordingly, in a case where an input pen touches a specific position on the surface of the liquid crystal panel 20, the optical sensor elements 30 can read the position and input information to the device or cause an intended operation to be carried out. Thus, the liquid crystal display device 400 of the present embodiment can attain a touch panel function by use of the optical sensor elements 30.

In the present invention, an optical sensor element may not be necessarily provided in each pixel. For example, the present invention encompasses a configuration in which an optical sensor is provided in each of pixels having any one of color filters of R, G and B.

Further, as with the liquid crystal display device 100, the liquid crystal display device 400 includes a liquid crystal drive circuit (not shown in FIG. 7) which performs display drive on the liquid crystal panel 20 and an area sensor control section (not shown in FIG. 7) which drives the area sensor.

The liquid crystal display device 400 of the present embodiment includes the reflectance changing section 50. This reduces a reflectance of light from the backlight 10, in a case where a finger or the like touches the detection target surface 400a and pressure is applied on the detection target surface 400a, as with the liquid crystal display device 100 of First Embodiment. Therefore, the liquid crystal display device 400 of the present embodiment can distinguish a case where a finger, an input pen or the like touches the panel surface from a case where a finger, an input pen or the like does not touch the panel surface more precisely than the conventional liquid crystal display device including an area sensor.

However, in a case where an object that touches the detection target surface 400a has a high reflectance, an amount of light detected by the optical sensor elements 30 in a region where the object touches the panel surface is not sufficiently different from an amount of light detected by optical sensor elements in a region where the object does not touch the panel surface even if the liquid crystal display device 400 includes the reflectance changing section 50. This may deteriorate detection sensitivity regarding whether the panel surface is touched or not. That is, the sensitivity of the optical sensor elements is changed depending on a reflectance of light on an input object such as a finger, an input pen or the like. For example, if the input object is made of a material such as metal which has a high reflectance, the reflectance of the light from the backlight 10 is not much reduced even in a case where the input object touches the panel surface, as compared to a case where the input object does not touch the panel surface.

For solving the problem, in the liquid crystal display device 400 of the present embodiment, the ¼λ phase plate 90 is provided above the front polarizing plate 40a (that is, provided closer to the image display surface than the front polarizing plate 40a). This can reduce reflected light from the input object such as a finger, an input pen or the like and can solve the problem that the reflectance of the input object affects the detection sensitivity of the optical sensor elements.

Figure 8:
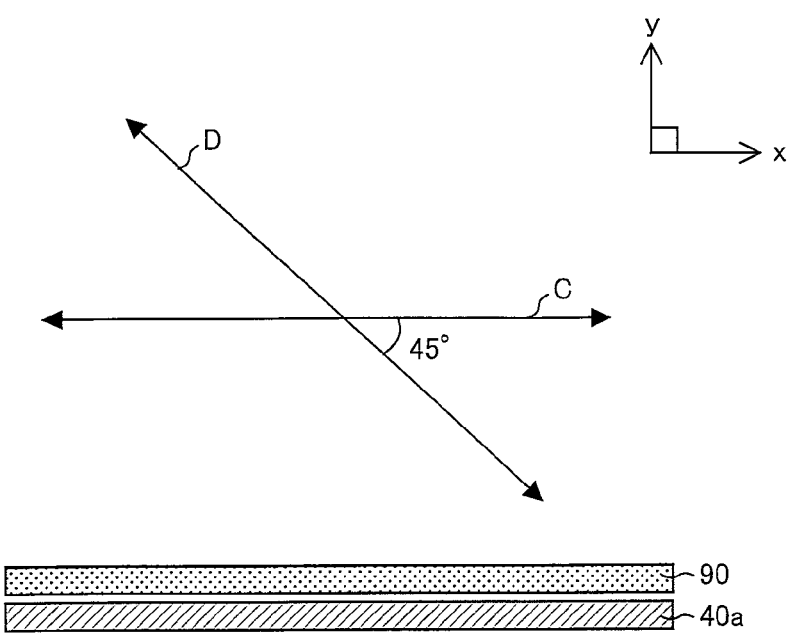
FIG. 8 is a diagram schematically showing a positional relationship between a transmission axis of a front polarizing plate and a slow axis of a ¼λ phase plate which front polarizing plate and ¼λ phase plate are provided in the liquid crystal display device shown in FIG. 7.

FIG. 8 shows a positional relationship between a transmission axis C of the front polarizing plate 40a and a slow axis D of the ¼λ phase plate 90. As shown in FIG. 8, the transmission axis C of the front polarizing plate 40a is disposed so as to be inclined at an angle of 45° with respect to the slow axis D of the ¼λ phase plate 90.

FIG. 10 shows polarization states of light in a case where the front polarizing plate 40a and the ¼λ phase plate 90 are disposed in the positional relationship shown in FIG. 8. The polarization states shown in (1), (2) and (3) of FIG. 10 correspond to polarization states of light in positions shown in (1), (2) and (3) of FIG. 9, respectively. FIG. 10 schematically shows a state in which light (shown as an arrow) from the backlight 10 passes through the ¼λ phase plate 90 and is reflected by an input object 180 such as an input pen and the light then passes back through the ¼λ phase plate 90.

As shown in (1) of FIG. 10, the light from the backlight 10 passes through the front polarizing plate 40a having the transmission axis C and becomes linearly-polarized light in the same direction (which is defined as an x direction) as the direction of the transmission axis C. Subsequently, when the linearly-polarized light in the x direction passes through the ¼λ phase plate 90, the linearly-polarized light becomes circularly-polarized light as shown in (2) of FIG. 10. This is because ¼ wavelength phase difference occurs in the linearly-polarized light. The circularly-polarized light is reflected on a surface of the input object 180 and then passes back through the ¼λ phase plate 90.

When the circularly-polarized light passes through the ¼λ phase plate 90, the circularly-polarized light becomes linearly-polarized light in a y direction perpendicular to the x direction, as shown in (3) of FIG. 10. As shown in FIG. 8, the transmission axis C of the front polarizing plate 40a is in the x direction. Therefore, the linearly-polarized light in the y direction cannot pass through the front polarizing plate 40a.

As described above, the reflected light from the input object 180 is blocked to some extent by the ¼λ phase plate 90 provided. This can prevent the optical sensor elements 30 from detecting such reflected light. According to the foregoing configuration of the present embodiment, it is therefore possible to reduce influence on the optical sensor elements which influence is caused by the reflected light from the input object 180 such as a finger, an input pen or the like. It is also possible to more precisely distinguish a case where the input object touches the panel surface from a case where the input object does not touch the panel surface.

FIG. 11 shows a relationship between a crossing angle θ and a reducing effect on reflected light from the input object 180. The crossing angle θ is an angle at which the transmission axis C of the front polarizing plate 40a and the slow axis D of the ¼λ phase plate 90 cross each other. Here, the front polarizing plate 40a and the ¼λ phase plate 90 are provided in the liquid crystal display device 400. A longitudinal axis of FIG. 11 represents a ratio at which the reflected light from the input object 180 reaches the optical sensor elements 30. Further, in FIG. 11, (i) a full line shows a ratio at which reflected light reaches the optical sensor elements 30 in a case where a contact portion of the input object 180 in which portion the input object 180 contacts the panel surface is a mirror surface; (ii) a dashed line shows a ratio at which reflected light reaches the optical sensor elements 30 in a case where specular reflection and scatter reflection (diffuse reflection) coexist at the contact portion; and (iii) an alternate long and short dash line shows a ratio at which reflected light reaches the optical sensor elements 30 in a case where just scatter reflection (diffuse reflection) occurs at the contact portion.

It is not scatteringly reflected light but a specularly reflected component among the reflected light from the input object 180 that is blocked in the configuration of the present embodiment.

Therefore, in a case where the reflected light from the input object 180 is only the specularly reflected light component (in a case of the full line of FIG. 11), the reflected light is completely blocked and does not reach the optical sensor elements 30 when the transmission axis C crosses the slow axis D at a crossing angle θ of 45°. Further, as the crossing angle θ deviates away from the angle of 45°, a ratio at which the reflected light is blocked reduces.

Meanwhile, in a case where the reflected light from the input object 180 is only scatteringly reflected light component (in a case of the alternate long and short dash line of FIG. 11), the reflected light from the input object is not reduced regardless of a value of the crossing angle θ. This applies to a case where the input object 180 is a paper or the like.

Further, as shown by the dashed line in FIG. 11, in a case where the specular reflection and the scatter reflection coexist, it is possible to obtain a reducing effect at a level between levels of the reducing effects of the above two cases.

Furthermore, the case where the specular reflection and the scatter reflection coexist as shown in the dashed line of FIG. 11 is a case where the input object 180 is a finger or the like. In this case, it is possible to expect a reducing effect at a level of approximately 50% of the reflected light of a case where only specular reflection occurs. Moreover, in a case where the input target 180 is made of metal, a slightly greater reducing effect of the reflected light can be obtained, as compared to a case where the input object 180 is a finger.

Note that an arrangement of the front polarizing plate 40a and the ¼λ phase plate 90 in the positional relationship as described above is one preferable example of the present invention, and the present invention is not limited to such an arrangement. As long as (i) the slow axis D of the ¼λ phase plate 90 is disposed so as to be inclined to some extent with respect to the transmission axis C of the front polarizing plate 40a (that is, the slow axis D is not parallel to the transmission axis C) and (ii) the slow axis D is not perpendicular to the transmission axis C, the reflected light from the input object 180 can be reduced. As a gradient angle (crossing angle θ) at which the slow axis D and the transmission axis C cross each other approaches an angle of 45°, more reflected light can be reduced.

Accordingly, it is preferable that the gradient angle of the slow axis D with respect to the transmission axis C ranges from an angle of 23° (45°−22°) to an angle of 67° (45°+22°). In this range, as shown in FIG. 11, in a case where reflected light is specularly reflected light, at least 50% of an effect of the ¼λ phase plate 90 can be exerted.

Further, it is more preferable that the gradient angle of the slow axis D with respect to the transmission axis C is 45°. In this case, as shown in FIG. 11, the specularly reflected light from the input object can be reliably blocked.

Furthermore, according to the foregoing configuration, by providing the ¼λ phase plate 90 on a top surface of the liquid crystal display device 400, it is possible to prevent occurrence of such a problem that, for example, in a case where the screen is viewed through polarized sunglasses, a screen cannot be viewed because the transmission axis of the front polarizing plate 40a is perpendicular to a transmission axis of the polarized sunglasses.

Moreover, by providing the ¼λ phase plate 90, it is possible to prevent an image that is displayed on the liquid crystal panel 20 from being reflected on the panel surface 400a and being shown on a substrate surface where the optical sensor elements 30 are provided. As a result, it is possible to prevent the optical sensor elements 30 from recognizing such an image. This point is described below with reference to FIGS. 12 to 14.

Figure 14:
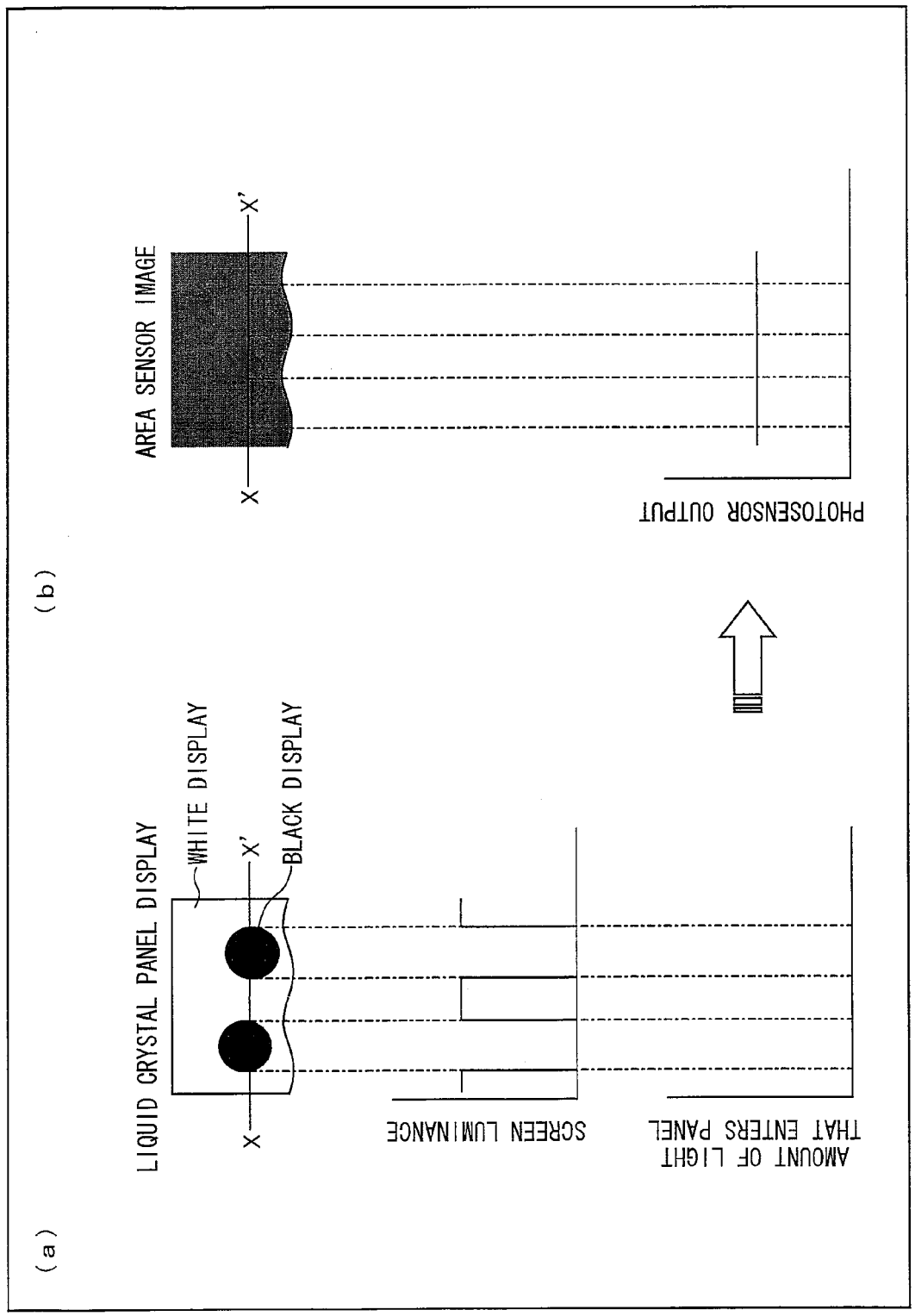
FIGS. 14(a) and (b) are diagrams schematically showing a relationship between an image displayed on a liquid crystal panel and an image recognized by an area sensor, in a liquid crystal display device that includes a ¼λ phase plate.

(a) of FIG. 12 shows a state in which light that has exited from a liquid crystal panel is reflected at an interface of a panel surface, in a liquid crystal display device that includes no ¼λ phase plate. FIG. 13 schematically shows a relationship between an image displayed on a liquid crystal panel and an image recognized by an area sensor, in the liquid crystal display device that includes no ¼λ phase plate. FIG. 14 schematically shows a relationship between an image displayed on a liquid crystal panel and an image recognized by an area sensor, in a liquid crystal display device (for example, the liquid crystal display device 400 shown in FIG. 7) that includes a ¼λ phase plate.

As shown in (a) of FIG. 12, in a case where a liquid crystal display device includes no ¼λ phase plate, a part of light that has exited from the liquid crystal panel 20 passes through the front polarizing plate 40a having a transmission axis in a specific direction and becomes linearly-polarized light in the same direction (which is defined as a y direction) as that of the transmission axis (see (1) of (c) of FIG. 12). Subsequently, the part of the light from the liquid crystal panel 20 is reflected at an interface of the panel surface due to difference between a refractive index of a material constituting the panel surface and a refractive index of the air. The light that has been reflected at the interface of the panel surface 400a then passes straight through the front polarizing plate 40a and returns into the liquid crystal panel 20. This is because the light that has been reflected at the interface of the panel surface 400a remains as polarized light in parallel to a direction of the transmission axis of the front polarizing plate 40a (see (1) of (c) of FIG. 12).

Therefore, in a case where the liquid crystal panel 20 displays a monochrome image as shown in a top drawing of (a) of FIG. 13, luminance distribution in accordance with the display occurs (see a middle drawing of (a) of FIG. 13). Accordingly, difference in an amount of light caused by the luminance distribution occurs in the light which is reflected at the interface of the panel surface 400a and which returns into the liquid crystal panel (see a bottom drawing of (a) of FIG. 13).

As a result, the optical sensor elements 30 provided in the liquid crystal panel 20 recognize a display image as shown in an upper drawing of (b) of FIG. 13, and the display image affects a sensor output (see a lower drawing of (b) of FIG. 13).

Meanwhile, in the case where the ¼λ phase plate 90 is provided above the front polarizing plate 40a as described in the present embodiment, some of linearly-polarized light in a y direction (see (1) of (c) of FIG. 12) which has passed through the front polarizing plate 40a is reflected, as shown in (b) of FIG. 12, at the interface of the panel surface 400a and converted into polarized light (see (3) of (c) of FIG. 12) perpendicular to the transmission axis of the front polarizing plate 40a by a function of the ¼λ phase plate 90 (see (2) of (c) of FIG. 12). Therefore, the light that has been reflected at the interface of the panel surface 400a does not return into the liquid crystal panel 20.

Accordingly, even in a case where the liquid crystal panel 20a displays a monochrome picture as shown in a top drawing of (a) of FIG. 14 and where luminance distribution in accordance with the display occurs as shown in a middle drawing of (a) of FIG. 13, an amount of light that enters the liquid crystal panel 20 is not affected by the luminance distribution (see a bottom drawing of (a) of FIG. 14).

As a result, as shown in an upper drawing of (b) of FIG. 14, the image displayed on the liquid crystal panel 20 is not reflected on the optical sensor elements 30 provided in the liquid crystal panel 20, and the display image does not affect the sensor output (see a lower drawing of (b) of FIG. 14).

As described above, the liquid crystal display device of the present embodiment can detect a position more precisely because it is possible to reduce recognition of display contents on the liquid crystal panel by the optical sensor elements.

Third Embodiment

Figure 15:
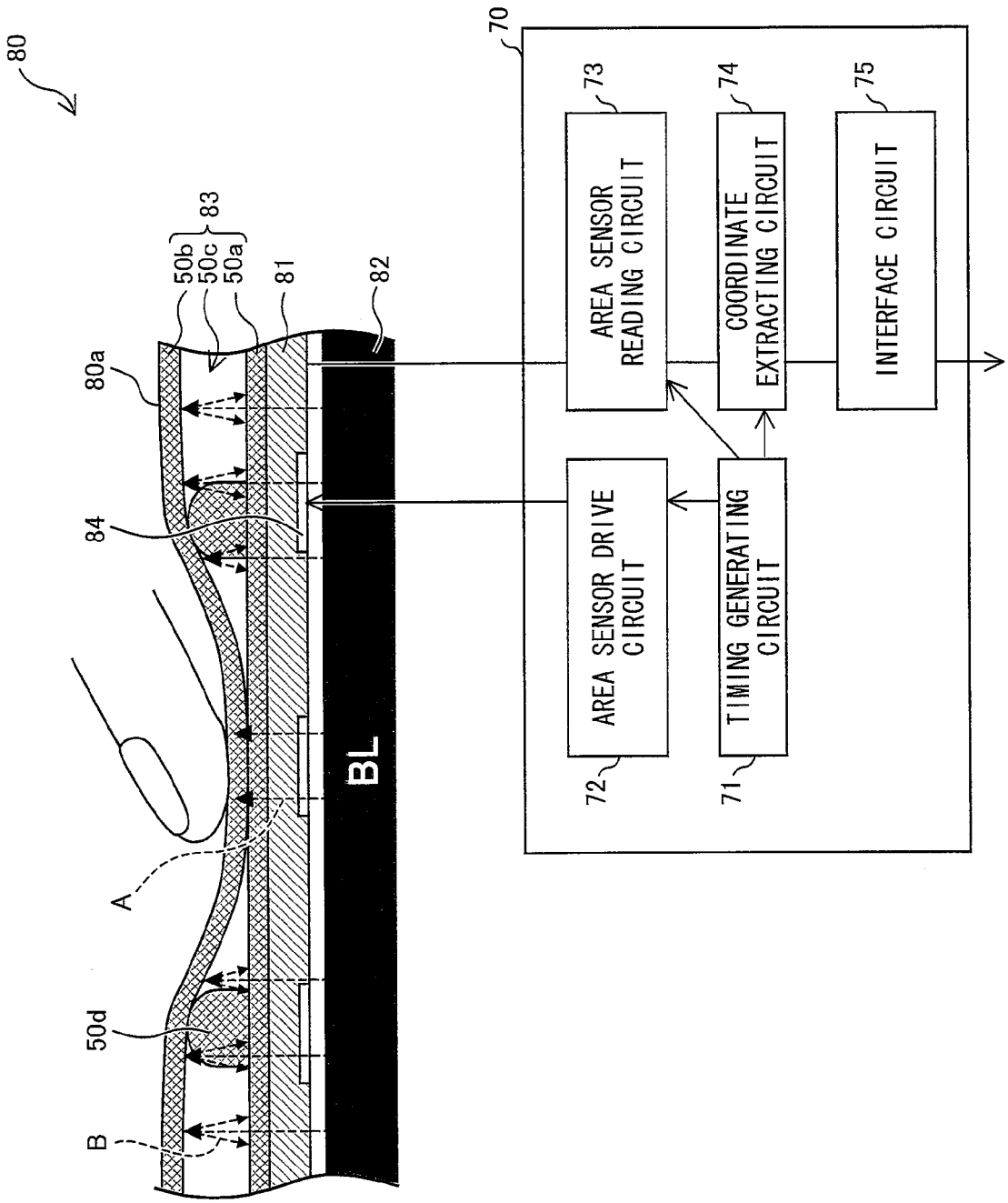
FIG. 15 is a diagram schematically showing a configuration of an area sensor according to an embodiment of the present invention.

The following describes Third Embodiment of the present invention with reference to FIG. 15. Note that the present invention is not limited to this embodiment.

In First Embodiment described above, a liquid crystal display device integrated with a touch panel having an area sensor function (specifically, a touch panel function) is described. Meanwhile, in Third Embodiment, an area sensor that is not integrated with a display device is described.

An area sensor 80 shown in FIG. 15 has a touch panel function in which a plurality of optical sensor elements 84 provided on a substrate 81 detects an image on a detection target surface 80a so as to detect an input position.

As shown in FIG. 15, the area sensor 80 includes: the substrate 81 (position detecting section) including the plurality of optical sensor elements 84; and a light-emitting section 82 which is provided on a backside of the substrate 81 and which illuminates the substrate. Each optical sensor element 84 is made of a photodiode or a phototransistor and causes a flow of an electric current in accordance with an intensity of received light so as to detect an amount of the received light. Such optical sensor elements can be formed according to a conventionally well-known method for manufacturing an area sensor.

Further, the area sensor 80 includes an area sensor control section 70 that drives the area sensor. As shown in FIG. 15, the area sensor control section 70 includes a timing generating circuit 71, an area sensor drive circuit 72, an area sensor reading circuit 73, a coordinate extracting circuit 74 and an interface circuit 75. For a configuration of the area sensor control section of the present embodiment, the configuration of First Embodiment or a conventionally well-known configuration can be used. Therefore, detailed description for the configuration of the area sensor control section of the present embodiment is omitted here.

The foregoing configuration of the area sensor 80 allows the optical sensor elements 84 formed on the substrate 81 to recognize a finger or an input pen as an image in a case where the finger or the input pen touches the detection target surface 80a. Thereby, it is possible to detect an input position.

Further, in the area sensor 80 of the present embodiment, a reflectance changing section 83 is provided on the substrate 81. As shown in FIG. 15, the reflectance changing section 83 is configured so that an air layer 50c is formed between two elastic films 50a and 50b in a state where no pressure is applied on the detection target surface 80a and so that the two elastic films 50a and 50b contact each other in a state where pressure is applied on the detection target surface 400a. Furthermore, projections 50d (distance retention sections) are provided on the elastic film 50a for reliably forming the air layer 50c. For a concrete configuration of the reflectance changing section 83, the configuration of the reflectance changing section described in First Embodiment can be used. Therefore, a detailed description for the reflectance changing section 83 is omitted in this embodiment.

The foregoing configuration reduces a reflectance of light from the light-emitting section 82 when a finger, an input pen or the like touches the detection target surface 80*a* and applies pressure on the detection target surface 80*a*. This allows for precise detection regarding whether or not a finger or an input pen touches the detection target surface 80*a*.

Another example of the area sensor of the present invention encompasses a configuration in which a front polarizing plate and a ¼λ phase plate as described in Second Embodiment are provided in the area sensor.

Specifically, the another example of the configuration encompasses a configuration in which (i) the front polarizing plate 40*a* described in Second Embodiment is provided on an upper surface of the reflectance changing section 83 of the area sensor 80 and (ii) the ¼λ phase plate 90 is provided further on an upper surface of the front polarizing plate 40*a*. According to the foregoing configuration, it is possible to more precisely distinguish a case where an input object such as a finger or a pen touches the detection target surface from a case where the input object such as the finger or the pen does not touch the detection target surface.

The present invention is not limited to the description of the embodiments above, but may be altered by a skilled person within the scope of the claims. An embodiment based on a proper combination of technical means disclosed in different embodiments is encompassed in the technical scope of the present invention.

A liquid crystal display device of the present invention includes: a position detecting section (i) including a plurality of optical sensor elements each detecting an intensity of received light and (ii) detecting the external input position according to detection of the image on the panel surface by use of the plurality of optical sensor elements; and a reflectance changing section reducing a reflectance of light from the backlight in response to application of pressure on the panel surface, the reflectance changing section including at least two elastic films, the reflectance changing section being configured so that in a state where no pressure is applied on the panel surface, an air layer is formed between the two elastic films whereas in a case where pressure is applied on the panel surface, the two elastic films contact each other.

An area sensor of the present invention includes: a position detecting section (i) including a plurality of optical sensor elements each detecting an intensity of received light and (ii) detecting the external input position according to detection of the image on the detection target surface by use of the plurality of optical sensor elements; a light emitting section illuminating the position detecting section from a backside of the position detecting section; and a reflectance changing section reducing a reflectance of the light from the light emitting section in response to application of pressure on the detection target surface, the reflectance changing section including at least two elastic films, and the reflectance changing section being configured so that in a state where no pressure is applied on the detection target surface, an air layer is formed between the two elastic films whereas in a case where pressure is applied on the detection target surface, the two elastic films contact each other.

According to the configuration, it is therefore possible to precisely distinguish a case where a finger, an input pen or the like touches a panel surface or a detection target surface from a case where a finger, an input pen or the like does not touch the panel surface or the detection target surface.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is preferably applicable to a display device having an area sensor function.

REFERENCE SIGNS LIST

10: Backlight (Light Emitting Section)
20: Liquid Crystal Panel (Position Detecting Section)
21: Active Matrix Substrate
22: Counter Substrate
23: Liquid Crystal Layer
30: Optical Sensor Element
40*a*: Front Polarizing Plate (Polarizing Plate Closer To Image Display Surface)
40*b*: Back Polarizing Plate
50: Reflectance Changing Section
51: Reflectance Changing Section
50*a*: Elastic Film
50*b*: Elastic Film
50*c*: Air Layer
50*d*: Projection (Distance Retention Section)
50*e*: Support Film (Support)
70: Area Sensor Control Section
80: Area Sensor
80*a*: Detection Target Surface
82: Light Emitting Section
83: Reflectance Changing Section
84: Optical Sensor Element
90: ¼λ Phase Plate (Quarter Wave Plate)
100: Liquid Crystal Display Device (Display Device)
100*a*: Panel Surface (Detection Target Surface)
400: Liquid Crystal Display Device (Display Device)
400*a*: Panel Surface (Detection Target Surface)
C: Transmission Axis Of Front Polarizing Plate
D: Slow Axis Of ¼λ Phase Plate

The invention claimed is:

1. A liquid crystal display device having an area sensor function for detecting an external input position by detecting an image on a panel surface, the liquid crystal display device comprising:
   a liquid crystal panel including:
      an active matrix substrate;
      a counter substrate; and
      a liquid crystal layer provided between the active matrix substrate and the counter substrate;
   a backlight illuminating the liquid crystal panel;
   a position detecting section (i) including a plurality of optical sensor elements each detecting an intensity of received light and (ii) detecting the external input position according to detection of the image on the panel surface by use of the plurality of optical sensor elements; and
   a reflectance changing section reducing a reflectance of light from the backlight in response to application of pressure on the panel surface,
   the reflectance changing section including at least two elastic films, the reflectance changing section being configured so that in a state where no pressure is applied on the panel surface, an air layer is formed between the two elastic films whereas in a case where pressure is applied on the panel surface, the two elastic films contact each other.

2. The liquid crystal display device as set forth in claim 1, wherein:
the reflectance changing section is provided with a distance retention section on at least one of the two elastic films, the distance retention section being for forming the air layer.

3. The liquid crystal display device as set forth in claim 1, wherein:
the liquid crystal panel is provided between two polarizing plates provided so as to face each other; and
the reflectance changing section is provided between the liquid crystal panel and a polarizing plate provided closer to an image display surface than the other polarizing plate.

4. The liquid crystal display device as set forth in claim 1, further comprising:
a quarter wave plate provided closer to the image display surface, as compared to the polarizing plate provided closer to the image display surface than the other polarizing plate.

5. The liquid crystal display device as set forth in claim 4, wherein:
the quarter wave plate has a slow axis, the slow axis being disposed so as to be inclined at an angle of 45° with respect to a polarization transmission axis of the polarizing plate provided closer to the image display surface than the other polarizing plate.

6. The liquid crystal display device as set forth in claim 1, wherein:
the reflectance changing section further includes a support that supports the two elastic films.

7. The liquid crystal display device as set forth in claim 2, wherein:
the distance retention section is provided plurally and randomly between the two elastic films.

8. An area sensor detecting an external input position by detecting an image on a detection target surface,
the area sensor comprising:
a position detecting section (i) including a plurality of optical sensor elements each detecting an intensity of received light and (ii) detecting the external input position according to detection of the image on the detection target surface by use of the plurality of optical sensor elements;
a light emitting section illuminating the position detecting section from a backside of the position detecting section; and
a reflectance changing section reducing a reflectance of the light from the light emitting section in response to application of pressure on the detection target surface,
the reflectance changing section including at least two elastic films, and the reflectance changing section being configured so that in a state where no pressure is applied on the detection target surface, an air layer is formed between the two elastic films whereas in a case where pressure is applied on the detection target surface, the two elastic films contact each other.

9. The area sensor as set forth in claim 8, wherein:
the reflectance changing section is provided with a distance retention section on at least one of the two elastic films, the distance retention section being for forming the air layer.

10. The area sensor as set forth in claim 8, wherein:
the reflectance changing section further includes a support that supports the two elastic films.

11. A display device comprising a display panel including the area sensor as set forth in claim 8.

* * * * *